United States Patent
Solow

(10) Patent No.: US 10,205,707 B2
(45) Date of Patent: Feb. 12, 2019

(54) CONTENT CONSUMPTION FRUSTRATION

(71) Applicant: Cisco Technology, Inc., San Jose, CA (US)

(72) Inventor: Hillel Solow, Beit Shemesh (IL)

(73) Assignee: Syamedia Limited, Middlesex (GB)

( * ) Notice: Subject to any disclaimer, the term of this patent is extended or adjusted under 35 U.S.C. 154(b) by 87 days.

(21) Appl. No.: 15/168,053

(22) Filed: May 29, 2016

(65) Prior Publication Data

US 2016/0277364 A1 Sep. 22, 2016

Related U.S. Application Data

(63) Continuation of application No. 13/700,214, filed as application No. PCT/IB2011/053065 on Jul. 10, 2011, now Pat. No. 9,379,893.

(51) Int. Cl.
*H04L 29/06* (2006.01)
*H04N 21/235* (2011.01)
(Continued)

(52) U.S. Cl.
CPC ............ *H04L 63/0428* (2013.01); *H04L 9/28* (2013.01); *H04L 12/18* (2013.01); *H04L 63/061* (2013.01);
(Continued)

(58) Field of Classification Search
CPC ......... H04L 63/0428; H04L 9/08; H04L 9/00; H04L 9/0883; H04K 1/00; H04N 21/2351;
(Continued)

(56) References Cited

U.S. PATENT DOCUMENTS 5,504,933 A * 4/1996 Saito .................... G06Q 20/342
348/E7.056
5,638,399 A 6/1997 Schuchman et al.
(Continued)

FOREIGN PATENT DOCUMENTS

EP 0167442 1/1986
EP 0247790 12/1987
(Continued)

OTHER PUBLICATIONS

Wright et al.; Security Considerations for Broadcast Systems; Information Security Technical Report, Elsevier Advanced Technology, vol. 11, No. 3; Jan. 1, 2006; pp. 137-146, XP025173945.
(Continued)

*Primary Examiner* — Farid Homayounmehr
*Assistant Examiner* — Sanchit K Sarker
(74) *Attorney, Agent, or Firm* — Merchant & Gould P.C.

(57) ABSTRACT

A Headend system including a packer to pack media content into a plurality of packets including a first packet and a second packet, a packet scheduler to schedule when the packets will be broadcast/multicast to a plurality of end-user devices, and calculate a plurality of timing values including a first timing value which provides an indication of how long the second packet will arrive at the end-user devices after the arrival of the first packet at the end-user devices, and an encryption engine to: encrypt the media content of the packets and the timing values, wherein the media content of the first packet and the first timing value are encrypted by different encryption algorithms, or the same encryption algorithm with different cryptographic keys.

15 Claims, 15 Drawing Sheets

(51) Int. Cl.
  *H04N 21/418*     (2011.01)
  *H04N 21/426*     (2011.01)
  *H04N 21/434*     (2011.01)
  *H04N 21/4405*    (2011.01)
  *H04N 21/4623*    (2011.01)
  *H04N 21/643*     (2011.01)
  *H04L 9/28*       (2006.01)
  *H04L 12/18*      (2006.01)

(52) U.S. Cl.
  CPC ..... *H04N 21/2351* (2013.01); *H04N 21/4181* (2013.01); *H04N 21/42615* (2013.01); *H04N 21/434* (2013.01); *H04N 21/4405* (2013.01); *H04N 21/4623* (2013.01); *H04N 21/64315* (2013.01)

(58) Field of Classification Search
  CPC ......... H04N 21/4181; H04N 21/42615; H04N 21/4405
  USPC .................................. 380/255, 225; 713/171
  See application file for complete search history.

(56) References Cited

U.S. PATENT DOCUMENTS

| | | | | |
|---|---|---|---|---|
| 5,878,135 | A * | 3/1999 | Blatter | H04N 21/4147 348/E5.004 |
| 6,173,114 | B1 * | 1/2001 | Yanagihara | H04N 5/775 369/47.28 |
| 7,065,213 | B2 | 6/2006 | Pinder | |
| 7,263,497 | B1 * | 8/2007 | Wiser | G06Q 20/3829 705/26.8 |
| 7,496,198 | B2 | 2/2009 | Pinder et al. | |
| 7,584,495 | B2 | 9/2009 | Hannuksela et al. | |
| 7,613,112 | B2 | 11/2009 | Jyske et al. | |
| 8,379,156 | B2 * | 2/2013 | Nakamura | H04N 5/50 348/725 |
| 2002/0023143 | A1 * | 2/2002 | Stephenson | H04L 63/029 709/218 |
| 2002/0196939 | A1 | 12/2002 | Unger et al. | |
| 2003/0095664 | A1 * | 5/2003 | Asano | G11B 20/00086 380/277 |
| 2003/0188192 | A1 * | 10/2003 | Tang | H04L 63/0263 726/13 |
| 2003/0226020 | A1 * | 12/2003 | Ripley | H04N 7/16 713/176 |
| 2004/0103428 | A1 * | 5/2004 | Seok | H04N 7/1675 725/25 |
| 2004/0181800 | A1 * | 9/2004 | Rakib | H04L 63/062 725/25 |
| 2004/0215708 | A1 * | 10/2004 | Higashi | G06F 21/10 709/201 |
| 2005/0015583 | A1 * | 1/2005 | Sarkkinen | H04L 12/1859 713/150 |
| 2005/0041696 | A1 | 2/2005 | Pekonen | |
| 2005/0152551 | A1 | 7/2005 | Defreese et al. | |
| 2005/0163121 | A1 * | 7/2005 | Asano | H04L 45/00 370/389 |
| 2005/0202829 | A1 * | 9/2005 | Onggosanusi | G01S 19/256 455/456.1 |
| 2005/0210500 | A1 * | 9/2005 | Stone | H04N 7/173 725/31 |
| 2006/0217063 | A1 | 9/2006 | Parthasarathy | |
| 2006/0233369 | A1 * | 10/2006 | Pinder | H04L 63/0428 380/216 |
| 2006/0282668 | A1 * | 12/2006 | Leitch | H04L 9/00 713/171 |
| 2007/0002852 | A1 | 1/2007 | Pekonen | |
| 2007/0002870 | A1 | 1/2007 | Pekonen | |
| 2007/0002871 | A1 | 1/2007 | Pekonen | |
| 2007/0116285 | A1 | 5/2007 | Nakai et al. | |
| 2007/0147409 | A1 | 6/2007 | Kallio et al. | |
| 2007/0153686 | A1 * | 7/2007 | Xiang | H04L 47/10 370/229 |
| 2007/0288749 | A1 * | 12/2007 | Lee | H04L 63/0428 713/160 |
| 2008/0045145 | A1 * | 2/2008 | Nakatsugawa | H04B 7/155 455/11.1 |
| 2008/0123659 | A1 * | 5/2008 | Rosenau | G06F 12/0246 370/395.7 |
| 2009/0123131 | A1 * | 5/2009 | Morioka | H04L 9/0844 386/241 |
| 2009/0237395 | A1 * | 9/2009 | Lee | G09G 3/20 345/214 |
| 2009/0327691 | A1 * | 12/2009 | Kishore | H04L 63/0428 713/150 |
| 2010/0313009 | A1 * | 12/2010 | Combet | G06Q 30/0204 713/150 |
| 2011/0043493 | A1 * | 2/2011 | Chen | G09G 3/3685 345/204 |
| 2011/0051672 | A1 * | 3/2011 | Lee | H04L 5/0007 370/329 |
| 2011/0138465 | A1 * | 6/2011 | Franklin | G06F 21/552 726/23 |
| 2011/0252445 | A1 * | 10/2011 | Ko | H04N 5/44543 725/40 |
| 2012/0063461 | A1 * | 3/2012 | Lautenschlaeger | H04L 45/02 370/392 |
| 2012/0117617 | A1 * | 5/2012 | Krupp | H04L 63/20 726/1 |
| 2013/0089203 | A1 * | 4/2013 | Solow | H04N 21/2351 380/255 |
| 2014/0376645 | A1 * | 12/2014 | Kumar | H04N 19/89 375/240.27 |

FOREIGN PATENT DOCUMENTS

| | | |
|---|---|---|
| EP | 779727 | 6/1997 |
| EP | 1413133 | 1/2003 |
| EP | 1337071 | 8/2003 |
| EP | 1474906 | 8/2003 |
| EP | 1622278 | 2/2006 |
| EP | 1825676 | 6/2006 |
| GB | 2443235 | 4/2008 |
| JP | 10271479 | 10/1998 |
| WO | WO 2002/11443 | 2/2002 |
| WO | WO 2003/036902 | 5/2003 |
| WO | WO 2007/082124 | 7/2007 |
| WO | WO 2010/000692 | 1/2010 |

OTHER PUBLICATIONS

ETSI EN 302 755; Annex E of "Digital Video Broadcasting (DVB); Frame Structure Channel Coding and Modulation for a Second Generation Digital Terrestrial Television Broadcasting System (DVB-T2)"; V1.1.1; Sep. 2009.

Functional Model of a Conditional Access System; EBU Technical Review, No. 266, Dec. 21, 1995, pp. 64-77.

Digital Video Broadcasting (DVB); DVB-H Implementation Guidelines European Broadcasting Union; ETSI TR 102 377, vol. BC, No. V1.2.1, Nov. 1, 2005; XP014032216; ISSN:0000-0001.

* cited by examiner

CONTENT CONSUMPTION FRUSTRATION

The present application is a continuation of U.S. application Ser. No. 13/700,214 filed 13 Dec. 2012, now U.S. Pat. No. 9,379,893 which is a U.S. national stage application of international application PCT/IB2011/053065, filed on 10 Jul. 2011 and entitled "Content Consumption Frustration", which was published on 3 May 2012 in the English language with International Publication Number WO 2012/056333 and which relies for priority on UK Patent Application 1018134.5, filed 27 Oct. 2010, all of which are entirely incorporated herein by reference.

FIELD OF THE INVENTION

The present invention relates to frustrating illegal content consumption in a broadcast/multicast media environment.

BACKGROUND OF THE INVENTION

The following references are believed to represent the state of the art:

U.S. Pat. No. 5,638,399 to Schuchman, et al.;
U.S. Pat. No. 7,065,213 to Pinder;
U.S. Pat. No. 7,496,198 to Pinder, et al.;
U.S. Pat. No. 7,584,495 to Hannuksela, et al.;
U.S. Pat. No. 7,613,112 to Jyske, et al.;
U.S. Published Patent Application 2005/0041696 of Pekonen;
U.S. Published Patent Application 2007/0002852 of Pekonen, et al.;
U.S. Published Patent Application 2007/0002870 of Pekonen, et al.;
U.S. Published Patent Application 2007/0002871 of Pekonen, et al.;
U.S. Published Patent Application 2007/0147409 of Kallio, et al.; and
U.S. Published Patent Application 2007/0288749 of Lee.

SUMMARY OF THE INVENTION

The present invention, in certain embodiments thereof, seeks to provide an improved system for frustrating illegal content consumption.

By way of introduction, conditional access systems typically protect access to the broadcast media content by encrypting all channels based on a control word. The control word is typically changed periodically to increase security. A control message, for example an entitlement control message (ECM), is typically sent the end-use devices to convey information for extracting a control word(s) needed to decrypt and view a channel. A valid and authorized secure processor, such as a smart card, is typically needed to extract the control words in each end-user device.

Generally, hackers have been unsuccessful in eliminating the need for a valid smart card by reverse engineering. Instead, hackers have turned to "card sharing" solutions, whereby a single valid smartcard allows many non-paying users to access the content. "Card sharing" typically involves a hacker with a valid and authorized smart card, either distributing the control words for one or more channels, or alternatively, allowing users to send arbitrary ECM information to the valid card, for example, across the internet, and receive the generated control words in response.

Delaying the delivery of the control word by the smartcard to the end-user device to be as close as possible to the moment when the control word is needed for decrypting the content frustrates "card sharing". Non-paying users may be inconvenienced due to the extra delay that propagation via the internet introduces as a result of receiving the control word later than it is needed for decrypting the content arriving in the broadcast stream. To thwart this delay, more sophisticated devices are used, which are capable of buffering the encrypted stream until the correct control word arrives, allowing the user to view the content delayed by 1-2 seconds, by way of example only.

In most systems, an end-user device receives a transport stream including several encoded and possibly encrypted channels. The end-user device's hardware and/or software is responsible for filtering out the data streams necessary for playback of a desired channel. This is typically called PID filtering, as each packet in the stream has a known packet identifier (PID), which can be used to quickly decide if the packet is needed or not.

The system of the present invention, in embodiments thereof, aims to further frustrate the non-paying users by encrypting the PIDs of the media packets. The paying users are given the information necessary to correctly identify a desired channel in time to filter the packets of the desired channel by either mapping the non-encrypted PIDs to the encrypted PIDs or by decrypting the PIDs in the transport stream. However, the information necessary to correctly identify a desired channel is not available to the non-paying users in time to correctly filter the packets of the desired channel from the transport stream. Thus, the non-paying users would be forced to buffer not a single channel from the transport stream, but all the channels in the transport stream, possibly introducing more complexity in a hacker system, possibly requiring more sophisticated, and therefore more expensive hardware, hereby encouraging would-be hackers to subscribe to the paid service.

The secrets used to encrypt the PIDs are generally changed frequently, and typically, according to the cryptoperiods used when encrypting the payload of the media packets. The PIDs may be encrypted using the same control word and algorithm used to encrypt the payload of the media packets or using a different encryption key and/or encryption algorithm.

There is thus provided in accordance with an embodiment of the present invention, an end-user device including a receiver to receive a media stream from a Headend system, the media stream including media content for a plurality of services, the media content being packed into a plurality of packets, each one of the packets having a header and a payload, the payload of each one of the packets including a part of the media content of one of the services, a mapping table or at least two mapping tables, the mapping table directly mapping, or the at least two tables together indirectly mapping, the services to a plurality of packet-IDs such that each one of the services is mapped to one of the packet-IDs, thereby enabling the packets including the media content of the one service to be identified via the one packet-ID identifying the one service, a plurality of encrypted packet-IDs such that each one of the packets includes one of the encrypted packet-IDs in the header of the one packet so that the one encrypted packet ID included in the one packet is for the one service of the part of the media content included in the one packet, and a packet filter to perform the following derive the one packet-ID of the one service from the mapping table or the mapping tables, calculate the one encrypted packet-ID for the one service from the one packet-ID derived from the mapping table or mapping tables, and filter the packets with the header including the one encrypted packet-ID from the media stream yielding the packets including the part of the media content of the one service.

Further in accordance with an embodiment of the present invention, the packet filter is operative to calculate the one encrypted packet-ID from the one packet-ID by encrypting the one packet-ID using a first secret and a function.

Still further in accordance with an embodiment of the present invention, the receiver is operative to receive a control message from the Headend system including the first secret or information used to generate the first secret.

Additionally in accordance with an embodiment of the present invention, the device includes a decryption engine to decrypt the payload of the filtered packets using the first secret.

Moreover in accordance with an embodiment of the present invention, the device includes a decryption engine to decrypt the payload of the filtered packets using a second secret which is different from the first secret.

Further in accordance with an embodiment of the present invention, the first secret is changed periodically.

There is also provided in accordance with still another embodiment of the present invention, a method including receiving a media stream from a Headend system, the media stream including media content for a plurality of services, the media content being packed into a plurality of packets, each one of the packets having a header and a payload, the payload of each one of the packets including a part of the media content of one of the services, a mapping table or at least two mapping tables, the mapping table directly mapping, or the at least two tables together indirectly mapping, the services to a plurality of packet-IDs such that each one of the services is mapped to one of the packet-IDs, thereby enabling the packets including the media content of the one service to be identified via the one packet-ID identifying the one service, a plurality of encrypted packet-IDs such that each one of the packets includes one of the encrypted packet-IDs in the header of the one packet so that the one encrypted packet ID included in the one packet is for the one service of the part of the media content included in the one packet, deriving the one packet-ID of the one service from the mapping table or the mapping tables, calculating the one encrypted packet-ID for the one service from the one packet-ID derived from the mapping table or mapping tables, and filtering the packets with the header including the one encrypted packet-ID from the media stream yielding the packets including the part of the media content of the one service.

There is also provided in accordance with still another embodiment of the present invention, a Headend system including a packer to pack media content into a plurality of packets including a first packet and a second packet, a packet scheduler to schedule when the packets will be broadcast/multicast to a plurality of end-user devices, and calculate a plurality of timing values including a first timing value which provides an indication of how long the second packet will arrive at the end-user devices after the arrival of the first packet at the end-user devices, and an encryption engine to encrypt the media content of the packets and the timing values, wherein the media content of the first packet and the first timing value are encrypted by different encryption algorithms, or the same encryption algorithm with different cryptographic keys.

Still further in accordance with an embodiment of the present invention, the system includes a transmitter to wirelessly broadcast/multicast the encrypted media content and the encrypted timing values to the end-user devices.

Additionally in accordance with an embodiment of the present invention, the packer is operative to include the first timing value in the first packet.

There is also provided in accordance with still another embodiment of the present invention, a end-user device, including a wireless receiver to receive a first pocket including encrypted media content, an encrypted timing value, and a second packet after receiving the first packet, the second packet including more encrypted media content, a first decryption engine to decrypt the encrypted timing value yielding a non-encrypted timing value providing an indication of how long the second packet will arrive at the end-user device after the arrival of the first packet at the end-user device, a second decryption engine to decrypt the encrypted media content, wherein the media content and the timing value are decrypted by different decryption algorithms, or the same decryption algorithm with different cryptographic keys, and a controller to deactivate the wireless receiver from receiving data wirelessly after receiving the first packet, and activate the wireless receiver to receive the second packet in accordance with the timing value.

Moreover in accordance with an embodiment of the present invention, the system includes a secure processor including the first decryption engine and a secure clock, wherein the first decryption engine is operative to send the decrypted timing value to the secure clock, and the secure clock having a timing function, the secure clock being operative to track the timing value against the timing function.

Further in accordance with an embodiment of the present invention, the controller is operative to periodically interrogate the secure clock whether to activate the wireless receiver or not, and the secure clock is operative to respond to the interrogation of the controller the timing value being tracked against the timing function of the secure clock.

Still further in accordance with an embodiment of the present invention, the secure processor is included in a smart card.

There is also provided in accordance with still another embodiment of the present invention, a method including packing media content into a plurality of packets including a first packet and a second packet, scheduling when the packets will be broadcast/multicast to a plurality of end-user devices, calculating a plurality of timing values including a first timing value which provides an indication of how long the second packet will arrive at the end-user devices after the arrival of the first packet at the end-user devices, and encrypting the media content of the packets and the timing values, wherein the media content of the first packet and the first timing value are encrypted by different encryption algorithms, or the same encryption algorithm with different cryptographic keys.

There is also provided in accordance with still another embodiment of the present invention, a method including receiving at an end-user device a first packet including encrypted media content, an encrypted timing value, and a second packet after receiving the first packet, the second packet including more encrypted media content, decrypting the encrypted timing value yielding a non-encrypted timing value providing an indication of how long the second packet will arrive at the end-user device after the arrival of the first packet at the end-user device, decrypting the encrypted media content, wherein the media content and the timing value are decrypted by different decryption algorithms, or the same decryption algorithm with different cryptographic keys, deactivating the wireless receiver from receiving data wirelessly after receiving the first packet, and activating the wireless receiver to receive the second packet in accordance with the timing value.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
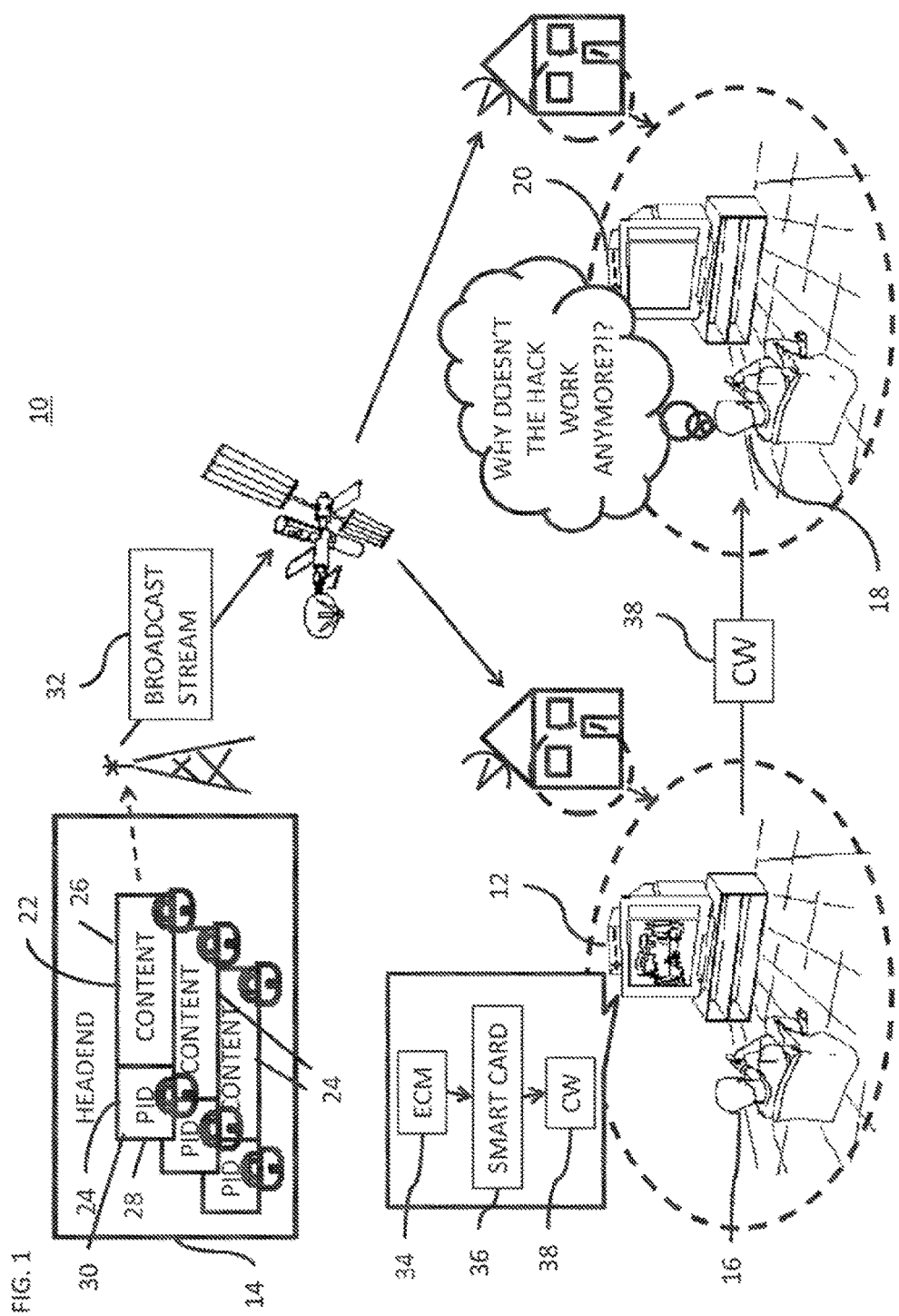
FIG. 1 is a partly pictorial, partly block diagram view of a media content delivery system constructed and operative in accordance with an embodiment of the present invention.

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and claims, in all their grammatical forms, to refer to the reverse of "encoded" and "compressed" in all their grammatical form.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled" and "decrypted" are used throughout the present specification and claims, in all their grammatical form, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example:

encoded, but neither scrambled nor encrypted;
compressed, but neither scrambled nor encrypted;
scrambled or encrypted, but not encoded;
scrambled or encrypted, but not compressed;
encoded, and scrambled or encrypted; or
compressed, and scrambled or encrypted.

Likewise, the terms "decoded" and "decompressed" one the one hand, and the terms "descrambled" and "decrypted" on the other hand, are used to refer to different and exclusive types of processing.

Reference is now made to FIG. 1, which is a partly pictorial, partly block diagram view of a media content delivery system 10 constructed and operative in accordance with an embodiment of the present invention.

The media content delivery system 10 includes a Headend 14 and a plurality of end-user devices 12. The users of the end-user devices 12 subscribe to media content 22 being delivered by the Headend 14. Only one end-user device 12 is shown in FIG. 1 for the sake of simplicity. The media content 22 is packed into a plurality of packets 24. Each of the packets 24 has a payload 26 and a header 28. The payload 26 of each packet 24 includes some of the media content 22. The header 28 of each packet includes a packet ID (PID) 30. The packet ID 30 is encrypted. The media content 22 in each packet is also typically encrypted. It should be noted that the media content 22 may be partially encrypted such that some of the packets 24 include encrypted media content 22 and some of the packets include the media content 22 in the clear. The media content 22 may also be partially encrypted within any one of the packets 24. The Headend 14 is described in more detail with reference to FIG. 2.

The packets 24 are then delivered to the end-user device 12 in a transport stream 32 by broadcast or multicast. The transport stream 32 may be broadcast/multicast using any suitable communication network, for example, but not limited to, satellite, cable, terrestrial, Internet or other wireless protocol.

In order for the end-user device 12 to filter the desired packets 24 for a particular service, the Headend 14 delivers a control message 34, for example, but not limited to, an entitlement control message (ECM) to the end-user devices 12. The control message 34 includes sufficient information for a smart card 36 of the subscriber 16 to extract a control word 38. The control word 38 may then be used to determine which of the packets 24 in the transport stream 32 should be filtered by the end-user device 12 for the desired service. The filtering of the packets 24 is described in more detail with reference to FIGS. 3 and 4.

A subscriber 16 of the end-user device 12 shown in FIG. 1 is involved in a "card sharing" scheme with a non-paying user 18 of an end-user device 20. The end-user device 12 of the subscriber 16 is illegally configured to send the extracted control word 38 to the end-user device 20 of the non-paying user 18. However, as the packet IDs 30 of the packets 24 in the transport stream 32 are encrypted, the end-user device 20 does not know which packets 24 to buffer until the control word 38 is sent from the end-user device 12 of the subscriber 16. Therefore, the end-user device 20 is forced to buffer all of the packets 24 in the transport stream 32 which may not be possible given the hardware/software configuration of the end-user device 20.

It should be noted that depending on the manner of implementation of the system 10, the system 10 may or may not comply with the transmission standards used in any given implementation, for example, but not limited to, compliance with the MPEG transmission standards.

It will be appreciated by those ordinarily skilled in the art that the term "packet ID", as used in the specification and claims, is not limited to a packet ID according to any particular standard, but the "term packet ID" is defined to include suitable information which allows sub-stream filtering and/or identifies the service or program or channel of media content in a content stream. The packet ID may be a PID in a DVB system, a multicast address or port number in an IP system, by way of example only.

Figure 2:
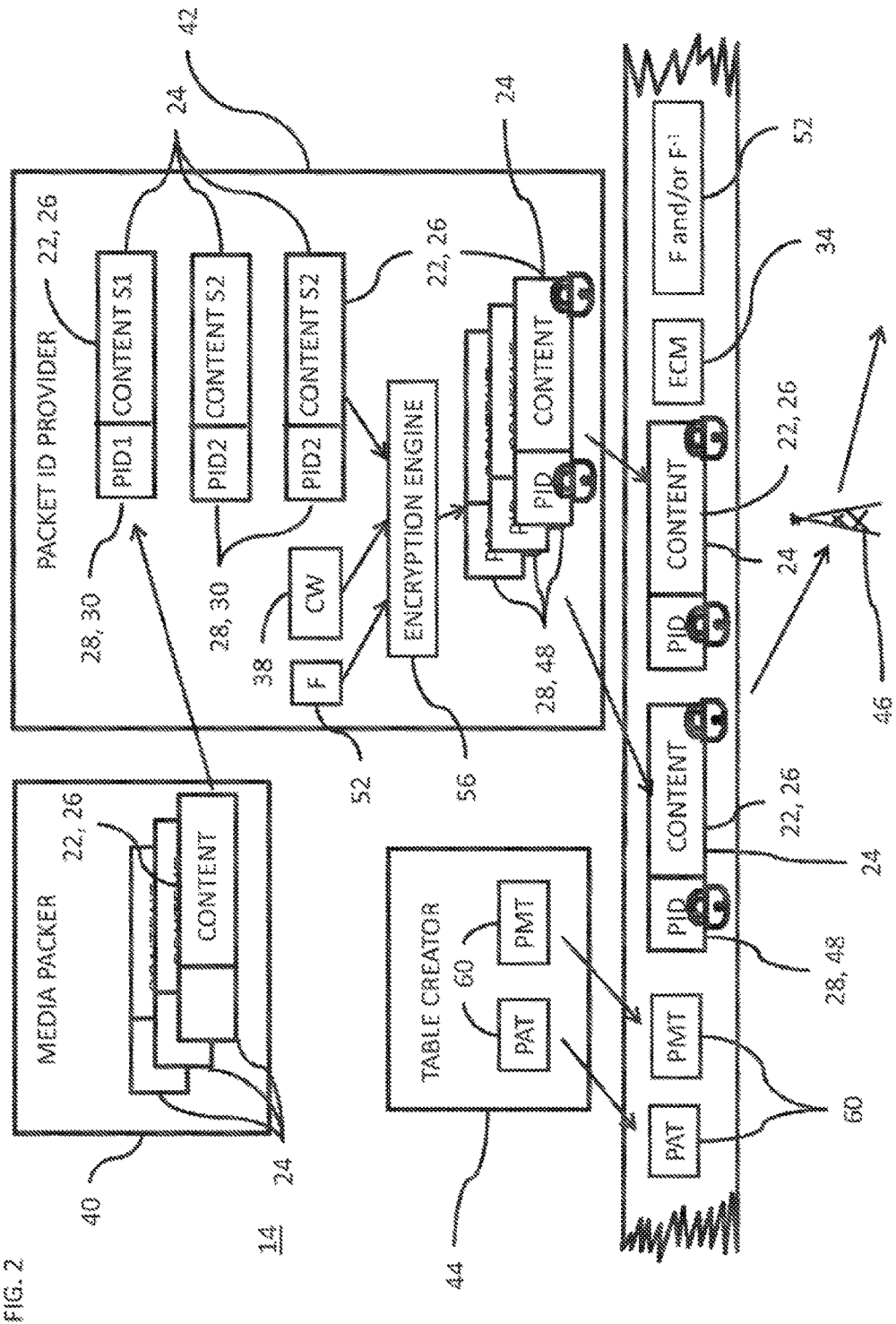
FIG. 2 is a partly pictorial, partly block diagram view of a Headend in the media content delivery system of FIG. 1.

Reference is now made to FIG. 2, which is a partly pictorial, partly block diagram view of the Headend 14 in the media content delivery system 10 of FIG. 1.

The Headend 14 is operative to broadcast/multicast media content 22 for a plurality of services (for example, but not limited to, Service 1 (S1) and Service 2 (S2) shown in FIG. 2) to the end-user devices 12 (FIG. 1).

The Headend 14 typically includes a media packer 40, a packet ID provider 42, a table creator 44 and a transmitter 46.

The media packer 40 is typically operative to pack the media content 22 into the packets 24. The payload 26 of each packet 24 typically includes a part of the media content 22 of one of the services. The media packer 40 is typically included in an encoder or multiplexer (not shown) of the Headend 14.

The packet ID provider 42 is preferably operative to provide the plurality of packet IDs 30 such that for each one of the services, the pockets 24 including the media content 22 of one service may be identified at the end-user devices 12 (FIG. 1) via the packet-ID 30 for that one service, for example, PID1 for service S1, PID2 for service 2.

The packet ID provider 42 typically includes an encryption engine 56 which is operative to encrypt the packet-IDs 30 yielding a plurality of encrypted packet-IDs 48. The encryption engine 56 is operative to encrypt the packet IDs 30 based on the secret 38 (control word) and a function 52.

The packet ID provider 42 is generally operative to include one of the encrypted packet-IDs 48 in the header 28 of each one of the packets 24, so that the encrypted packet ID 24 included in a packet 24 is for the service of the part of the media content 22 of that packet 24.

The secret 38 used to encrypt the packet ID 30 is generally changed periodically, and typically, according to the cryptoperiods used for encrypting the payload 26 of the media packets 24. The packet ID 30 may be encrypted using the same control word 38 and algorithm used to encrypt payload 26 of the media packets 24 or using a different encryption key and/or a different encryption algorithm.

Each encrypted packet-ID 48 may be determined from a hash of the secret 38 and one of the packet IDs 30. Alternatively, or additionally, the encrypted packet-IDs 48 may be determined using any suitable encryption algorithm(s), for example, but not limited to, AES or XOR.

The packet ID provider 42 is typically operative to create the control message 34 including the secret 38 or information used to generate the secret 38.

The encryption engine 56 is typically operative to encrypt the payload 26 of the packets 24 using the secret 38 or a different secret.

The table creator 44 is typically operative to create one or more mapping tables 60.

One mapping table 60 may directly map the services to the packet-IDs 30 such that each service is mapped to one of the packet-IDs 30 in the mapping table 60, thereby enabling the pockets 24 including the media content 22 of one service to be identified via the one packet-ID identifying that one service in the end-user devices 12.

Instead of using one mapping table 60 to directly map the services to the packet ID 30, a plurality of mapping tables 60 may be created to together indirectly map the services to the packet IDs 30. For example, the mapping tables 60 may include a Program Association Table (PAT) and a plurality of Program Map Tables (PMTs). The PAT typically maps each of the services to a different PMT. There is typically a PMT for each of the services with each PMT listing the different packet IDs 30 for a service, for example, but not limited to, a separate packet ID 30 for audio, video and subtitles for a service.

The functionality of the packet ID provider 42 and the table creator 44 is typically provided by the multiplexer (not shown) of the Headend 14. As making modifications to the multiplexer may be problematic or undesirable in some cases, alternative methods of implementation may be possible, such as post processing the data leaving the multiplexer.

The transmitter 46 is typically operative to broadcast/multicast the media transport stream 32 including: the packets 24 including the encrypted packet-IDs 48; the control message 34; the function 52 and/or an inverse of the function 52; and the mapping table(s) 60 to the end-user devices 12.

The function 52 and/or an inverse of the function 52 is sent to the end-user devices 12 to decrypt the encrypted packet-IDs 48 or encrypt the packet ID 30 as will be described in more detail with reference to FIGS. 3 and 4.

The choice as to whether to send the function 52 or an inverse of the function 52 to the end-user devices 12 may depend on the method employed at the end-user devices 12, described in more detail with reference to FIGS. 3 and 4.

Figure 3:
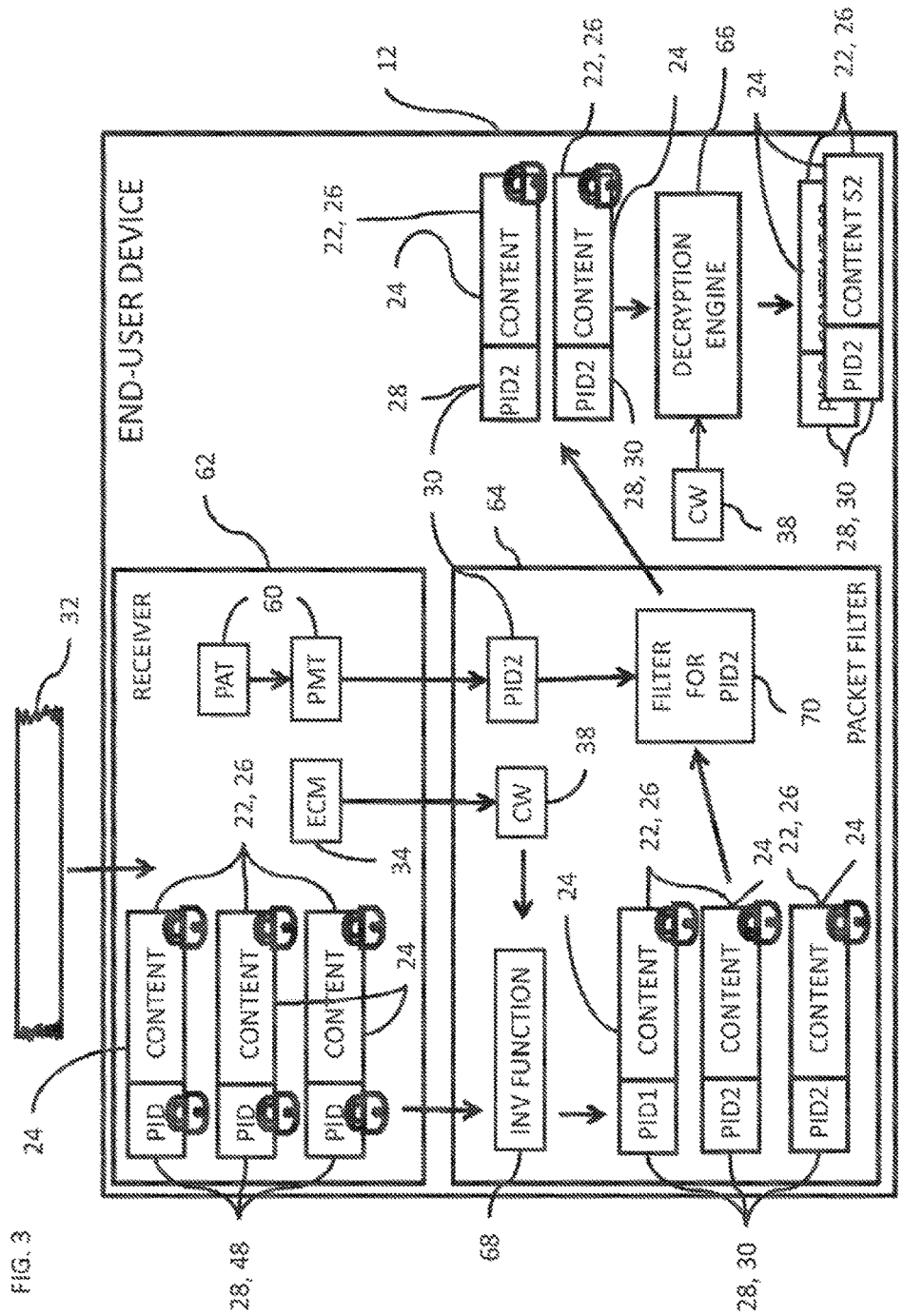
FIG. 3 is a partly pictorial, partly block diagram view of an end-user device in the media content delivery system of FIG. 1 filtering packets based on the packet ID of the packets.
Figure 4:
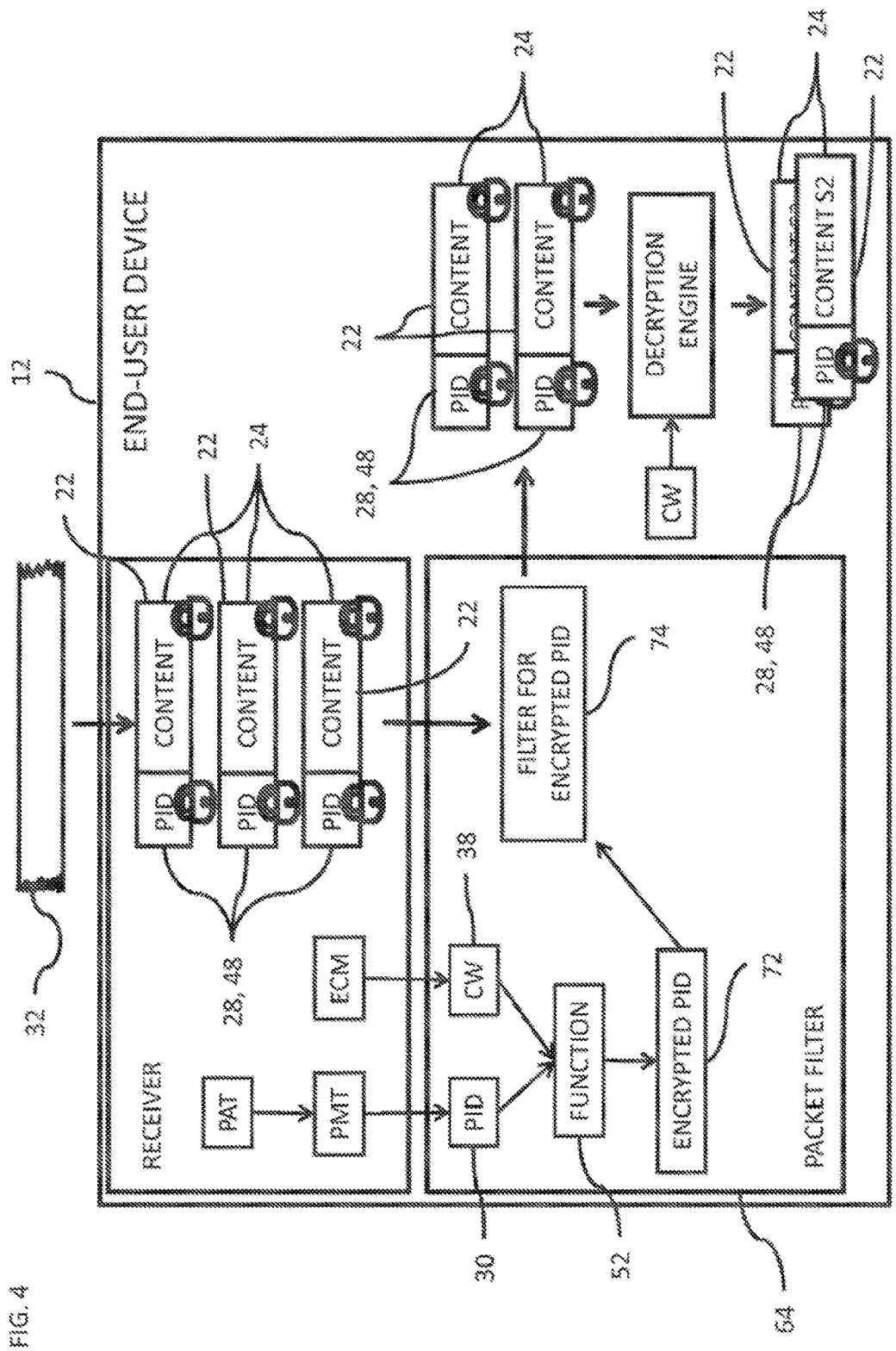
FIG. 4 is a partly pictorial, partly block diagram view of an end-user device in the media content delivery system of FIG. 1 filtering packets based on the encrypted packet ID of the packets.

Some devices 12 may employ the method of FIG. 3 and other devices 12 the method of FIG. 4. In such a case, the function 52 and the inverse of the function 52 are both sent to the end-user devices 12 so that each end-user device 12 can select which method to use.

A table mapping the packet IDs 30 to the encrypted packet-IDs 48 could be sent to the end-user devices 12 instead of the function 52 and/or the inverse of the function 52. The table could be encrypted with the secret 38.

It should be noted that in certain circumstances it may be unnecessary to send the function 52 or the inverse of the function 52 to the end-user devices 12 if the end-user devices 12 already include the function 52 or the inverse of the function 52, for example, but not limited to, when the function 52 or the inverse of the function 52 is the general decryption algorithm used in the end-user devices 12.

Reference is now made to FIG. 3, which is a partly pictorial, partly block diagram view of the end-user device 12 in the media content delivery system 10 of FIG. 1 filtering the packets 24 based on the packet ID 30 of the packets 24.

The end-user device 12 typically includes a receiver 62, a packet filter 64 and a decryption engine 66.

The receiver 62 is typically operative to receive the media transport stream 32 from the Headend 14. The transport stream 32 typically includes: the packets 24 including the encrypted packet-IDs 48 and the media content 22 for the services; the control message 34; the function 52 (FIG. 2) and/or an inverse of the function 52 (a function 68); and the mapping table(s) 60. Each one of the received packets 24 typically includes one of the encrypted packet-IDs 48 in the header 28 of that one packet 24 so that the encrypted packet ID 48 included in that one packet 24 is for the service of the part of the media content 22 included in that one packet 24, as described above with reference to FIG. 2.

The subscriber 16 (FIG. 1) is viewing service 2. The packet filter 64 is typically operative to derive the packet-ID 30 of service 2 from the mapping tables 60 (the PAT and the PMT for service 2). If one mapping table 60 is being used, then the packet-ID 30 for service 2 may be derived from the single mapping table 60.

The information in the control message 34 is passed to the smart card 36 (FIG. 1) which extracts the control word 38 from the information included in the control message 34. The smart card 36 is an example of a secure processor. It will be appreciated by those ordinarily skilled in the art that any suitable secure processor may be used instead of the smart card 36.

The packet filter 64 is operative to decrypt the encrypted packet-IDs 48 of the packets 24 in the media stream 32 yielding the packet IDs 30. The packet filter 64 is typically operative to decrypt the encrypted packet-IDs 48 in the media stream using the control word 38 and the function 68 which is typically an inverse of the function 52 (FIG. 2) used to encrypt the packet IDs 30 at the Headend 14.

The end-user device 12 or the smart card 36 (FIG. 1) may have the function 52 and/or the function 68 embedded therein. In such a case, it is generally unnecessary to include the function 52 or the function 68 in the transport stream 32.

The packet filter 64 is operative to filter the packets 24 with the desired packet-ID 30 (PID2 in the example of FIG. 3) for the desired service (service 2 in the example of FIG. 3) (block 70). Therefore, the packet filter 64 is typically operative to filter the packets 24, where the header 28 of the packets 24 includes the desired packet-ID 30, from the media stream 32, yielding the packets 24 including the part of the media content 22 of the desired service (service 2 in the example of FIG. 3).

The control message 34 is sent early enough by the Headend 14 (FIG. 2) in order to give the end-user devices 12 sufficient time to determine the new control word 38 based on the information in the control message 34 and decrypt the encrypted packet-IDs 48 in time to filter the packets 24 of the desired service from the incoming transport stream 32. However, the control message 34 is not sent too early, in order to prevent one of the end-user devices 12 illegally sending the control word 38 to the end-user device 20 of the non-paying user 18 in time for the end-user device 20 to filter the packets 24 of the desired service from the transport stream 32. Alternatively, or additionally, the smart card 36 may be configured to only release the extracted control word 38 at a certain time, or after a certain time delay, in order to prevent the end-user device 20 obtaining the control word 38 in time.

The decryption engine 66 is operative to decrypt the payload 26 of the filtered packets 24 using the control word 38.

In accordance with an alternative embodiment of the present invention, the decryption engine 66 is operative to decrypt the payload 26 of the filtered packets 24 using a secret which is different from the control word 38.

Reference is now made to FIG. 4, which is a partly pictorial, partly block diagram view of the end-user device 12 in the media content delivery system 10 of FIG. 1 filtering packets 24 based on the encrypted packet ID 48 of the packets 24.

The end-user device 12 of FIG. 4 is substantially the same as the end-user device 12 of FIG. 3 except for the following differences.

The packet filter 64 is typically operative to calculate an encrypted packet-ID 72 for the desired service (service 2 in the example of FIG. 4) from the packet-ID 30 which was derived from the mapping table(s) 60 for the desired service. The packet filter 64 is typically operative to calculate the encrypted packet-ID 72 from the derived packet-ID 30 by encrypting the derived packet-ID 30 using the control word 38 and the function 52.

The packet filter 64 is operative to filter the packets 24 with the header 28 including the encrypted packet-ID 48 equal to the encrypted packet-ID 72 from the media stream 32 yielding the packets 24 including the part of the media content 22 of the desired service (block 74).

The control message 34 is sent early enough by the Headend 14 (FIG. 2) in order to give the end-user devices 12 sufficient time to determine the new control word 38 based on the information in the control message 34 and determine the encrypted packet-IDs 72 in time to filter the packets 24 of the desired service from the incoming transport stream 32. However, the control message 34 is not sent too early, in order to prevent one of the end-user devices 12 illegally sending the control word 38 to the end-user device 20 of the non-paying user 18 in time for the end-user device 20 to filter the packets 24 of the desired service from the transport stream 32. Alternatively, or additionally, the smart card 36 may be configured to only release the extracted control word 38 at a certain time, or after a certain time delay, in order to prevent the end-user device 20 obtaining the control word 38 in time.

It will be appreciated that the end-user device 12 is typically operative to switch to filtering different encrypted packet-IDs 48 without causing a glitch in the playback of the audio and/or video.

The functionality of the packet filter 64 may be implemented with software only modification, including modification of hardware drivers, in many of the end-user devices 12.

Figure 5:
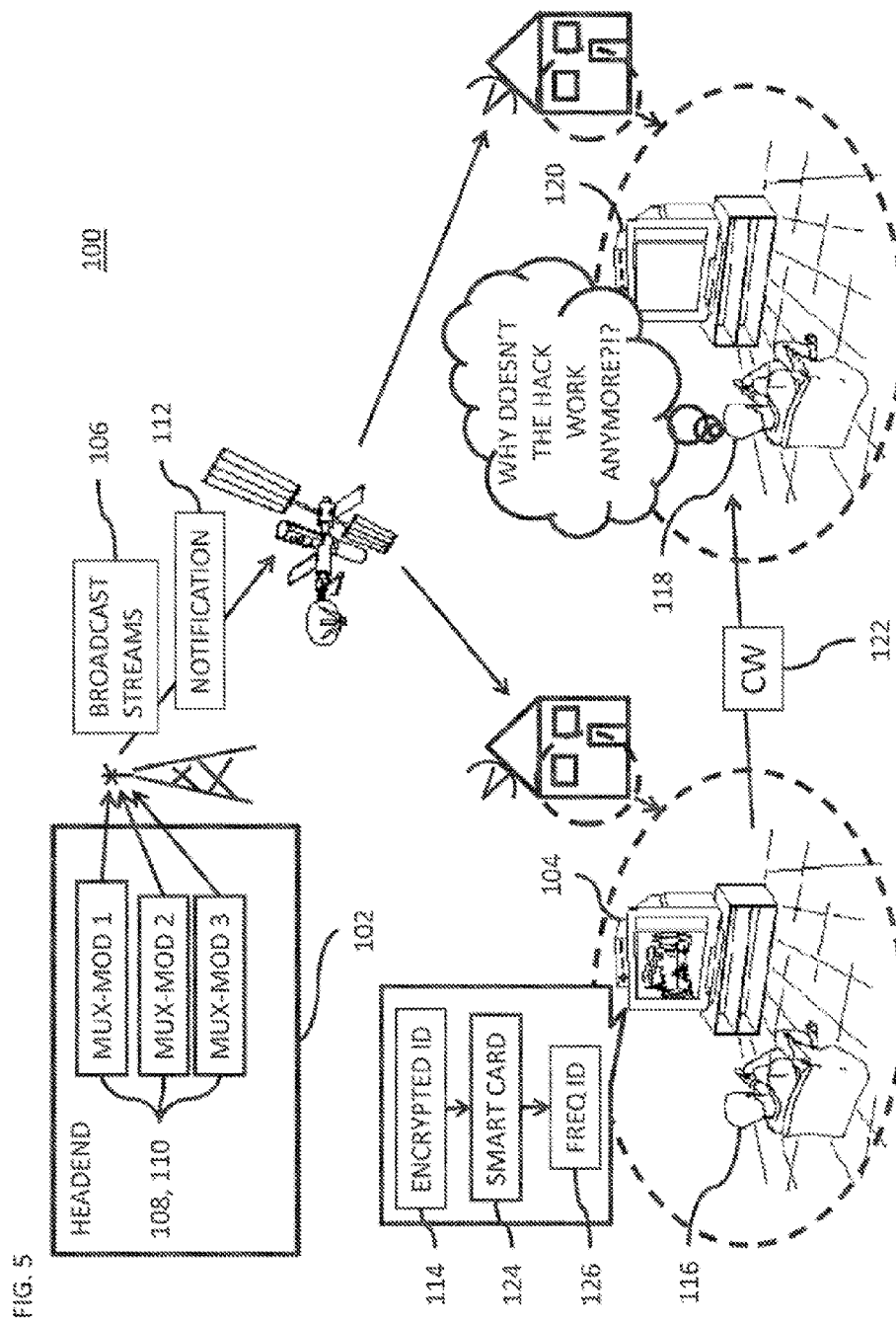
FIG. 5 is a partly pictorial, partly block diagram view of a media content delivery system constructed and operative in accordance with an embodiment of the present invention.

Reference is now made to FIG. 5, which is a partly pictorial, partly block diagram view of a media content delivery system 100 constructed and operative in accordance with an embodiment of the present invention.

The media content delivery system 100 typically includes a Headend 102 for broadcasting/multicasting content in a plurality of broadcast streams 106 to a plurality of end-user devices 104 (only one shown for the sake of clarity). Each of the end-user devices 104 subscribes to content provided by the Headend 102.

The media content included in the broadcast streams 106 is also typically encrypted. It should be noted that the media content may be partially encrypted as described with reference to the media content delivery system 10 of FIG. 1.

The broadcast streams 106 may be broadcast/multicast using any suitable communication network, for example, but not limited to, satellite, cable, terrestrial and Internet or other wireless protocol.

The Headend 102 generally includes a plurality of multiplexers 108 and a plurality of modulators 110. Each multiplexer 108 is typically paired with one of the modulators 110 so that the Headend 102 includes a plurality of multiplexer-modulator pairs. Each modulator 110 is operative to modulate the content of one of the broadcast streams 106 so that the different broadcast streams 106 have different modulation frequencies. Therefore, the content provided by the Headend 102 may be included in any one of the broadcast streams 106 according to an allocation which is typically decided at the Headend 102.

In order for the end-user devices 104 to filter the desired packets (not shown) for a particular service, the end-user devices 104 need to know which of the broadcast streams 106 includes the content of the particular service and then tune to that broadcast stream 106. In the media content delivery system 100, the content of the particular service is moved from one broadcast stream 106 to another broadcast stream 106 in order to thwart hackers, as will be described in more detail below.

Each time before the any service is moved from one of the broadcast streams 106 to another one of the broadcast streams 106, the Headend 102 is operative to send a notification 112 to the end-user devices 104. The notification 112 includes an encrypted identification 114 of the new modulation frequency of the broadcast stream 106 to which the service is moving to. Information necessary to decrypt the encrypted identification 114 may be sent to the end-user devices 104 and/or the smart card 124 (or other secure processor) to enable decryption of the encrypted identification 114 thereby yielding an identification 126 of the new modulation frequency. In accordance with an alternative embodiment of the present invention, the information necessary to decrypt the encrypted identification 114 may be already included in the end-user devices 104 and/or the smart card 124 by way of a secure function and/or secret.

The notification 112 is described in more detail with reference to FIG. 7.

A subscriber 116 of the end-user device 104 shown in FIG. 5 is involved in a "card sharing" scheme with a non-paying user 118 of an end-user device 120. The end-user device 104 of the subscriber 116 is illegally configured to send a plurality of extracted control words 122 to the end-user device 120 of the non-paying user 118 so that the end-user device 120 can decrypt the content sent from the Headend 102.

The sending of the notification 112 and/or sending the information necessary to decrypt the encrypted identification 114 and/or the time that the identification 126 is released by the smart card 124 for use by the end-user devices 104 is timed carefully such that the end-user devices 104 can decrypt the encrypted identification 114 in time to tune to the new modulation frequency, but in such a way that the non-paying user 118 cannot tune to the new modulation frequency in time for the change in frequency. Therefore, the non-paying user 118 will experience glitches in viewing unless the end-user device 120 buffers all of the broadcast streams 106 which may not be possible given the hardware/software configuration of the end-user device 120.

The timing issues regarding sending the notification 112 and/or the information necessary to decrypt the encrypted identification 114 will be described in more detail with reference to FIG. 7.

The media content delivery system 100 could also be combined with the media content delivery system 10 of FIG. 1 in other words encrypting PIDs as well as hopping frequencies in the same system.

The Headend 102 is now described in more detail below with reference to FIGS. 6-8. The end-user devices 104 are described in more detail below with reference to FIGS. 9-11.

Figure 6:
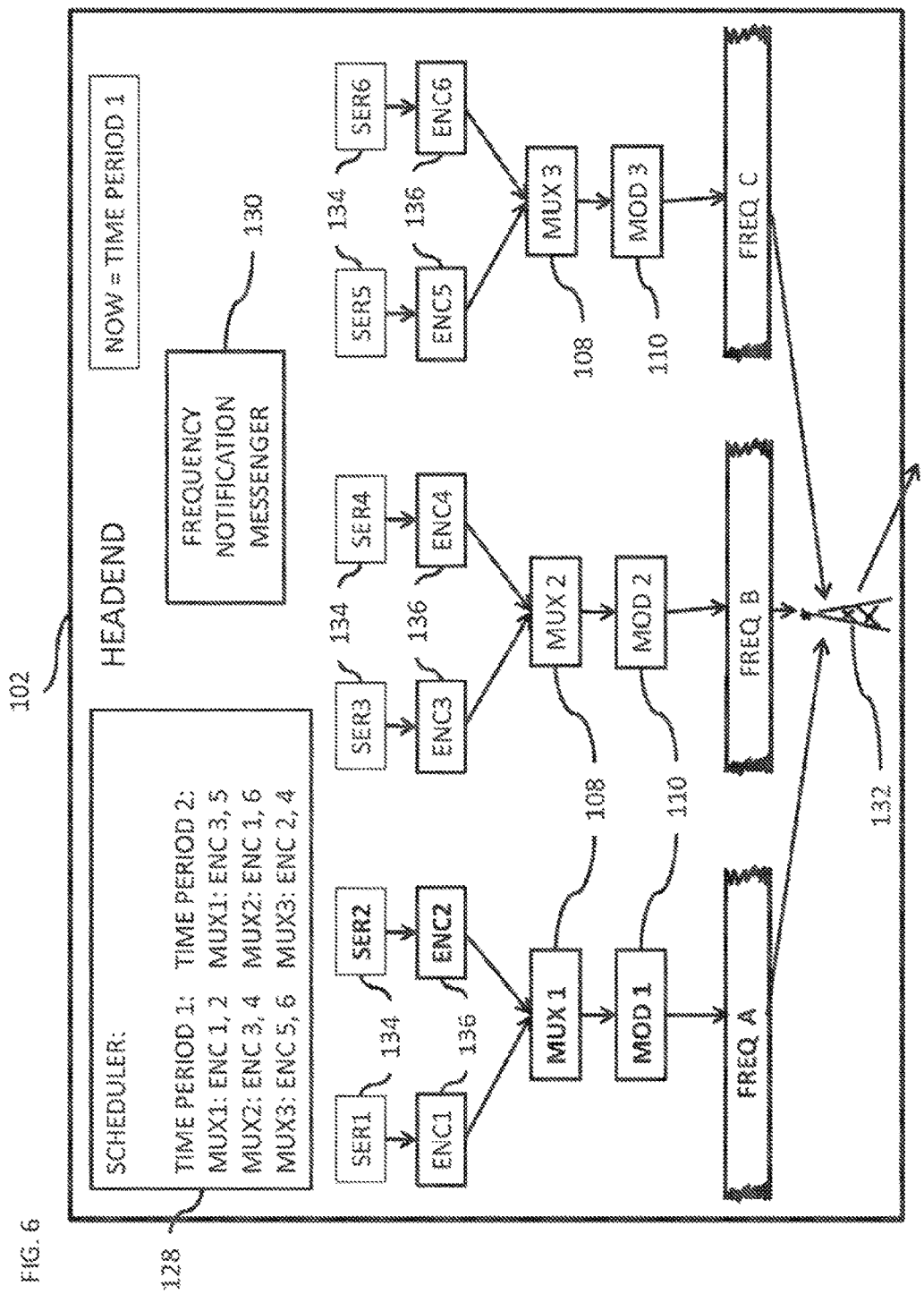
FIG. 6 is a partly pictorial, partly block diagram view of a Headend in the media content delivery system of FIG. 5 operating during time period 1.

Reference is now made to FIG. 6, which is a partly pictorial, partly block diagram view of the Headend 102 in the media content delivery system 100 of FIG. 5 operating during time period 1.

The Headend 102 typically includes a plurality of encoders 136 to encode media content of a plurality of services 134. Each of the encoders 136 is typically operative to encode the media content of one of the services 134.

The modulators 110 are generally operative to modulate the encoded media content of the services 134 for delivery to the end-user devices 104 (FIG. 5). Each of the modulators 110 is configured to produce media output of a different modulation frequency.

The Headend 102 also typically includes a scheduler 128, a frequency notification messenger 130 and a transmitter arrangement 132.

The scheduler 128 is typically operative to schedule the modulators 110 to modulate the media content of one of the services 134 (e.g. SER1) such that different modulators 110 modulate different parts of the media content of the service 134 (e.g. SER1) during different non-overlapping time periods so that only one of the modulators 110 is modulating the media content of the service 134 (e.g. SER1) at a time, thereby the modulation frequency with which the media content of the service 134 (e.g. SER1) is transmitted to the end-user devices 104 is changed a plurality of times. The scheduler 128 can perform the frequency hopping for one or more of the services 134.

In time period 1, shown in FIG. 6, SER1 is modulated by MOD1 with modulation frequency A.

As described above, each modulator 110 is operatively connected to one of the multiplexers 108. Therefore, the scheduler 128 is typically operative to schedule the modulators 110 by scheduling which multiplexer 108 should multiplex which service 134.

The scheduler 128 of FIG. 6 shows a schedule which assigns different multiplexers 108 to receive the output of different encoders 136 for time period 1 and time period 2 thereby modulating the different services 134 with different frequencies for the time period 1 and the time period 2, respectively.

The transmitter arrangement 132 is typically operative to broadcast/multicast the media content of the services 134 to the end-user devices 104 (FIG. 5). In particular, by way of example only, the transmitter arrangement 132 is operative to broadcast/multicast the media content of service SER1 for time period 1 with modulation frequency A to the end-user devices 104 (FIG. 5).

The frequency notification messenger 130 is described in more detail with reference to FIG. 7.

Figure 7:
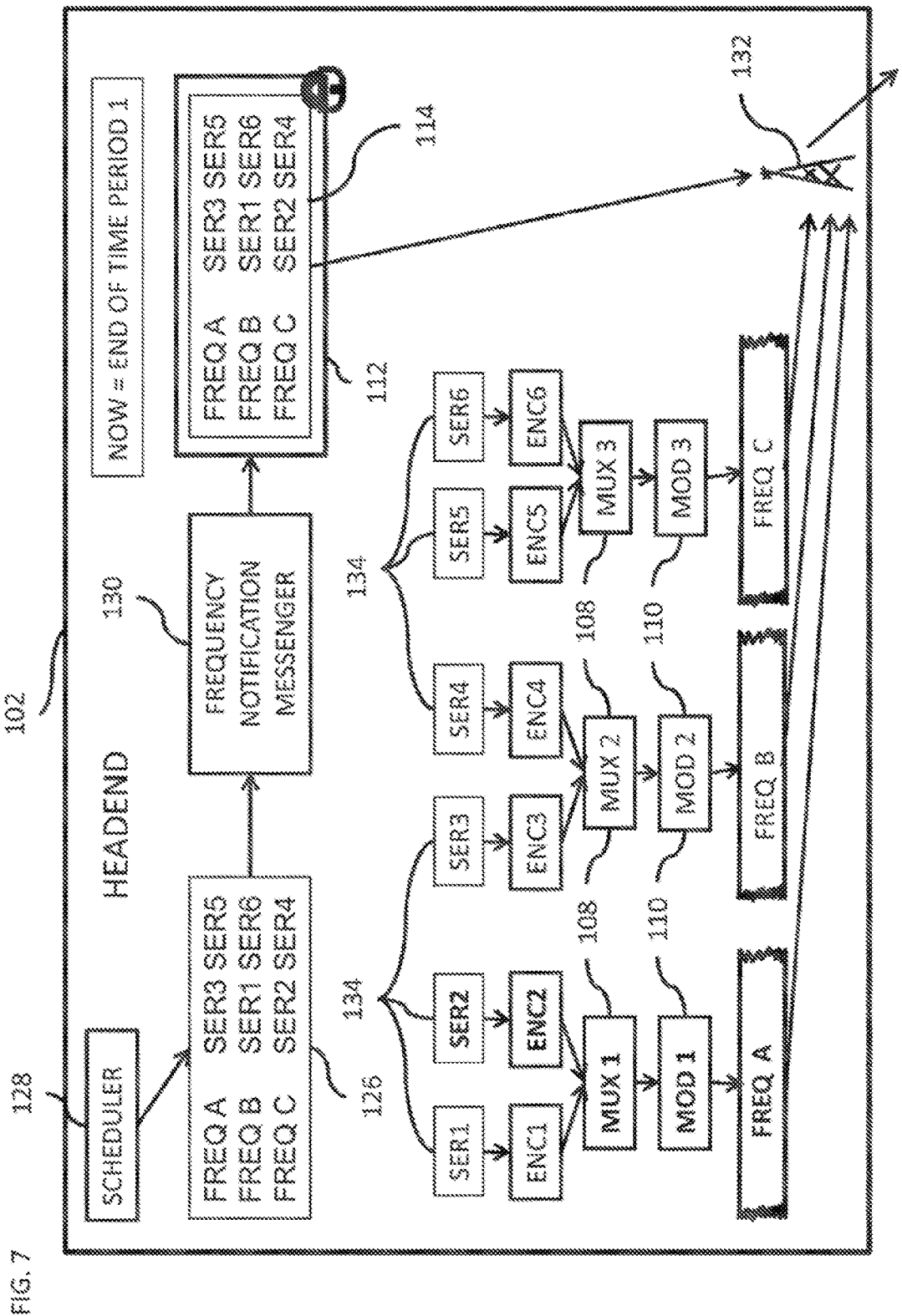
FIG. 7 is a partly pictorial, partly block diagram view of a Headend in the media content delivery system of FIG. 5 operating towards the end of time period 1.

Reference is now made to FIG. 7, which is a partly pictorial, partly block diagram view of the Headend 102 in the media content delivery system 100 of FIG. 5 operating towards the end of time period 1.

The frequency notification messenger 130 is typically operative to prepare the notification 112 for sending to the end-user devices 104 (FIG. 5) every time before the modulation frequency with which the media content of the service SER1 (or any other relevant service 134) is transmitted to the end-user devices 104 (FIG. 5) is going to be changed from one modulation frequency (e.g. frequency A) to a new modulation frequency (e.g. frequency B). The notification 112 typically includes the identification 126, which is at least partially encrypted (encrypted identification 114) of the new modulation frequency.

The frequency notification messenger 130 receives the scheduling information from the scheduler 128.

The notification 114 informs the end-user devices 104 (FIG. 5) that the media content of the service SER1 (or any other relevant service 134) will be transmitted using the new modulation frequency (or other new frequencies for other relevant services). The notification 112 shown in FIG. 7 lists the new frequencies for each of the services (SER1 to SER6) and also lists each of the services (SER1 to SER6) associated with each of the new frequencies. It should be noted that the frequencies are not necessarily new for the system, as content was likely broadcast/multicast using those frequencies until now. However, the term "new" frequency means that the frequency may be new for at least one service. It should be noted that even if a service is not going to change frequency, the service could still be listed in the notification 112 as a matter of convenience with the correct frequency for that service.

As the notification 112 may include more than one item of information for identifying which new frequency will be assigned to a service (e.g.: the notification 112 lists a frequency and at least one service associated with that frequency) then the identification 126 can be partially encrypted by encrypting the new frequency or the service associated with the new frequency in order to disguise the notification 112.

The identification 126 of the new frequency may be the actually new frequency value. In accordance with an alternative embodiment of the present invention, the identification 126 of the new modulation frequency may include an identification of an apparatus used to transmit and/or multiplex and/or modulate the media content with the new modulation frequency, for example, but not limited to, one of the multiplexers 108, one of the modulators 110, or a satellite transducer (not shown).

The identification 126 may be encrypted by just encrypting the identification 126 (partially or fully) or encrypting the notification message 112 which may include the identification 126 and other data. The encryption of the identification 126 could be based on: the control words 122 (FIG. 5) used to encrypt the media content sent from the Headend 102; and/or another secret sent to the end-user devices 104 (FIG. 5) (for example, but not limited to, based on information provided in out-of-band entitlement control message (ECM)); and/or a secret function and/or secret algorithm stored in the smart card 124 (FIG. 5) or other secure processor, by way of example only.

As described above with reference to FIG. 5, the sending of the notification 112 and/or sending the information necessary to decrypt the encrypted identification 114 and/or the time that the identification 126 is released by the smart card 124 (FIG. 5) for use by the end-user devices 104 (FIG. 5) is timed carefully such that the end-user devices 104 can decrypt the encrypted identification 114 in time to tune to the new modulation frequency, but in such a way that the non-paying user 118 (FIG. 5) cannot tune to the new modulation frequency in time for the change in frequency. Therefore, the non-paying user 118 (FIG. 5) will experience glitches in viewing unless the end-user device 120 (FIG. 5) buffers all the broadcast streams 106 which may not be possible given the hardware/software configuration of the end-user device 120 (FIG. 5).

The following describes some issue to be considered when deciding on timing issues of sending the notification 112 and/or the information necessary for decrypting the encrypted identification 114.

The end-user devices 104 (FIG. 5) which are subscribed to the media content provided by the Headend 102 need enough time to tune to the new frequency. Therefore, the slowest tuning time of the end-user devices 104 may need to be considered. The success of the media content delivery system 100 may also depend on the tuning time of the tuners of the end-user devices 104 being predictable and reasonably consistent across devices 104.

The notification 112 is generally broadcast/multicast and will likely be received by the end-user device 120 (FIG. 5) of the non-paying user 118 (FIG. 5). Therefore, if the information necessary to decrypt the encrypted identification 114 is sent (for example in an ECM) too far in advance of the frequency change, then the end-user device 104 (FIG. 5) of the subscriber 116 (FIG. 5) may send the decryption information for decrypting the encrypted identification 114 to the end-user device 120 (FIG. 5) in time for the end-user device 120 (FIG. 5) to decrypt the encrypted identification 114 and tune to the new frequency.

It should be noted that the time taken to send the identification 126 from the end-user device 104 (FIG. 5) of the subscriber 116 (FIG. 5) to the end-user device 120 (FIG. 5) of the non-paying user 118 (FIG. 5) could vary considerably, for example, but not limited to, when the identification 126 is sent via the Internet. Therefore, it may be simpler to send the information necessary to decrypt the encrypted identification 114 (for example in an ECM) at the same time or after the notification 112 is sent.

Sending the notification 112 typically acts as a trigger to change tuning to the new frequency without including a frequency change time in the notification 112. In accordance with an alternative embodiment of the present invention, the frequency change time is included in the notification 112.

If the smart card 124 (FIG. 5) is configured not to release the secret for decrypting the encrypted identification 114 until a certain time before the frequency change is going to take place, then the timing of the sending of the notification 112 and/or the information needed to decrypt the encrypted identification 114 may not be as critical.

The success of the media content delivery system 100 (FIG. 5) at causing glitches in the rendering by the end-user device 120 (FIG. 5) of the non-paying user 118 (FIG. 5) will depend on the Internet speed, the tuning time of the end-user device 120 (FIG. 5) and the timing issues discussed above. In some cases the media content delivery system 100 (FIG. 5) may only be able to cause glitches in some of the hacker devices.

The transmitter arrangement 132 is typically operative to broadcast/multicast the notification 112 to the end-user devices 104 (FIG. 5).

In accordance with the MPEG standard which typically uses a PMT table for signaling purposes, the PMT is typically the same even if the service moves frequency.

Figure 8:
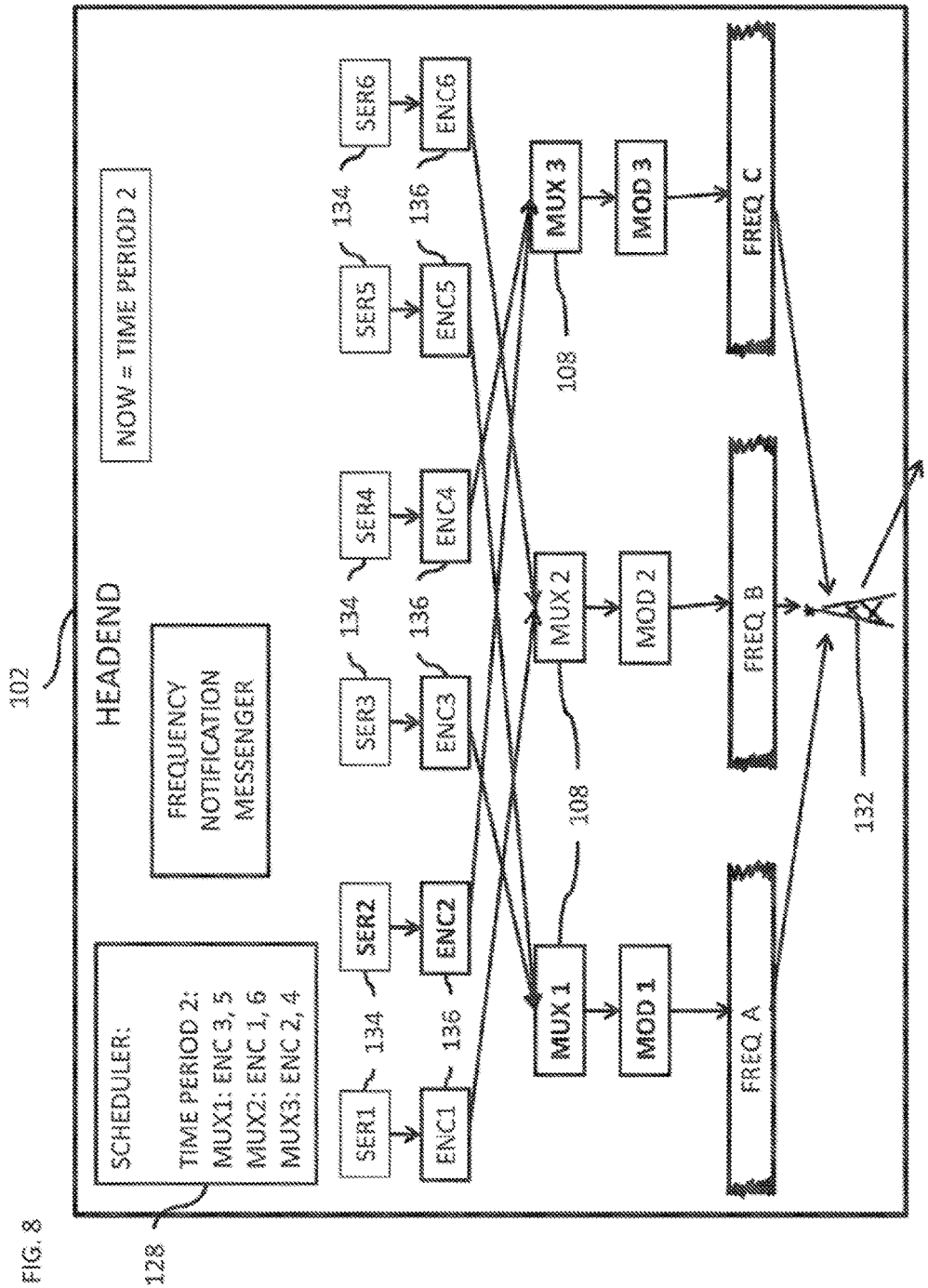
FIG. 8 is a partly pictorial, partly block diagram view of a Headend in the media content delivery system of FIG. 5 operating during time period 2.

Reference is now made to FIG. 8, which is a partly pictorial, partly block diagram view of the Headend 102 in the media content delivery system 100 of FIG. 5 operating during time period 2.

The assignment of the encoders 136 to the multiplexers 108 is changed in time period 2 per the schedule prepared by the scheduler 128.

The transmitter arrangement 132 is typically operative to broadcast/multicast the media content of the services 134 to the end-user devices 104 (FIG. 5). By way of example only, the transmitter arrangement 132 is operative to broadcast/multicast the media content of the service SER1 for time period 2 with the modulation frequency B to the end-user devices 104 (FIG. 5). It can also be seen from FIG. 8 that all the ether services are now being modulated at a different frequency as compared to time period 1.

Figure 9:
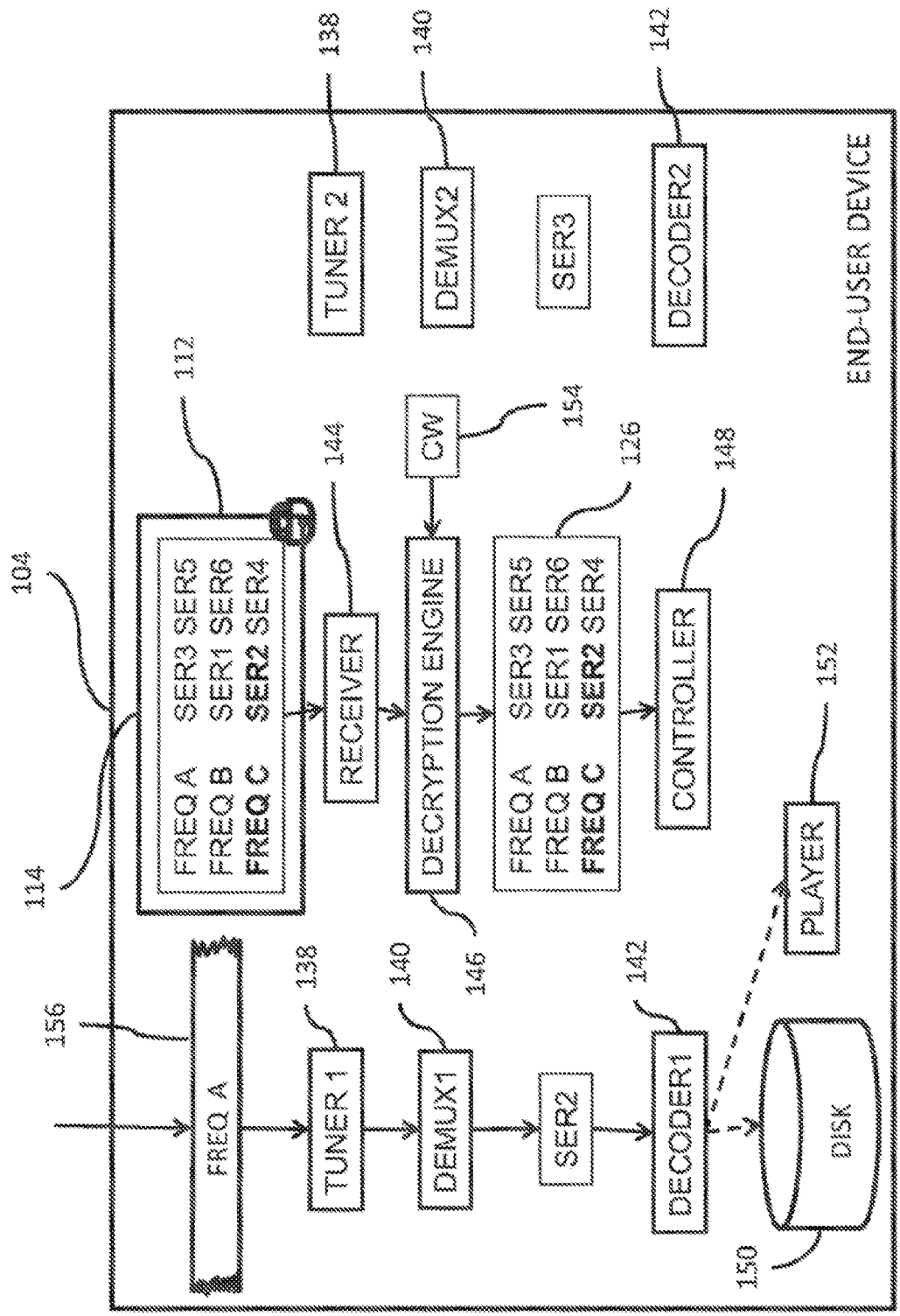
FIG. 9 is a partly pictorial, partly block diagram view of an end-user device in the media content delivery system of FIG. 5 tuning to a media content stream with modulation frequency A.

Reference is now made to FIG. 9, which is a partly pictorial, partly block diagram view of the end-user device 104 in the media content delivery system 100 of FIG. 5 tuning to a media content stream 156 with modulation frequency A.

The end-user device 104 typically includes: a tuner arrangement including a plurality of timers 138; a plurality of demultiplexers 140, a plurality of decoders 142, a receiver 144, a decryption engine 146, a controller 148, a storage device 150 and a player 152.

The tuner arrangement (TUNER 1) is operative to tune to modulation frequency A in order to receive media content of service 2.

The second tuner, TUNER 2, may be tuned to a different service, for example, but not limited to, service 3.

The media content of service 2 is typically demultiplexed by DEMUX1 and decoded by DECODER 1. The decoded media content of service 2 may then be stored in the storage device 150 and/or outputted via the player 152 to an output device, for example, but not limited to, a television, stereo system or any suitable audio and/or video output device.

The receiver 144 is typically operative to receive the notification 112 from the Headend 102 (FIG. 5) each time before the media content of the service 2 (or any other service) will be transmitted with a new modulation frequency. The notification 112 typically includes the encrypted identification 114 of the new modulation frequency. The notification 112 informs the end-user device 104 that the media content of the service 2 (or any other service) will be transmitted with the new modulation frequency.

The decryption engine 146 is operative to decrypt the encrypted identification 114 of the new modulation frequency based on a suitable secret 154. The secret 154 may be the control word received for decrypting the media content and/or the secret 154 may be received in a suitable message and/or the secret 154 may be based on secret generating information (e.g. from an out-of-band ECM) which is extracted in a secure processor such as the smart card 124 (FIG. 5) and/or the secret 154 may be based on a secret hard coded in the secure processor. As discussed above with reference to FIG. 7, a delay can be added in the smart card 124 (FIG. 5) to make sure that the secret 154 is not supplied by the smart card 124 before a certain time which may be designated in the notification 112 and/or an ECM.

Figure 10:
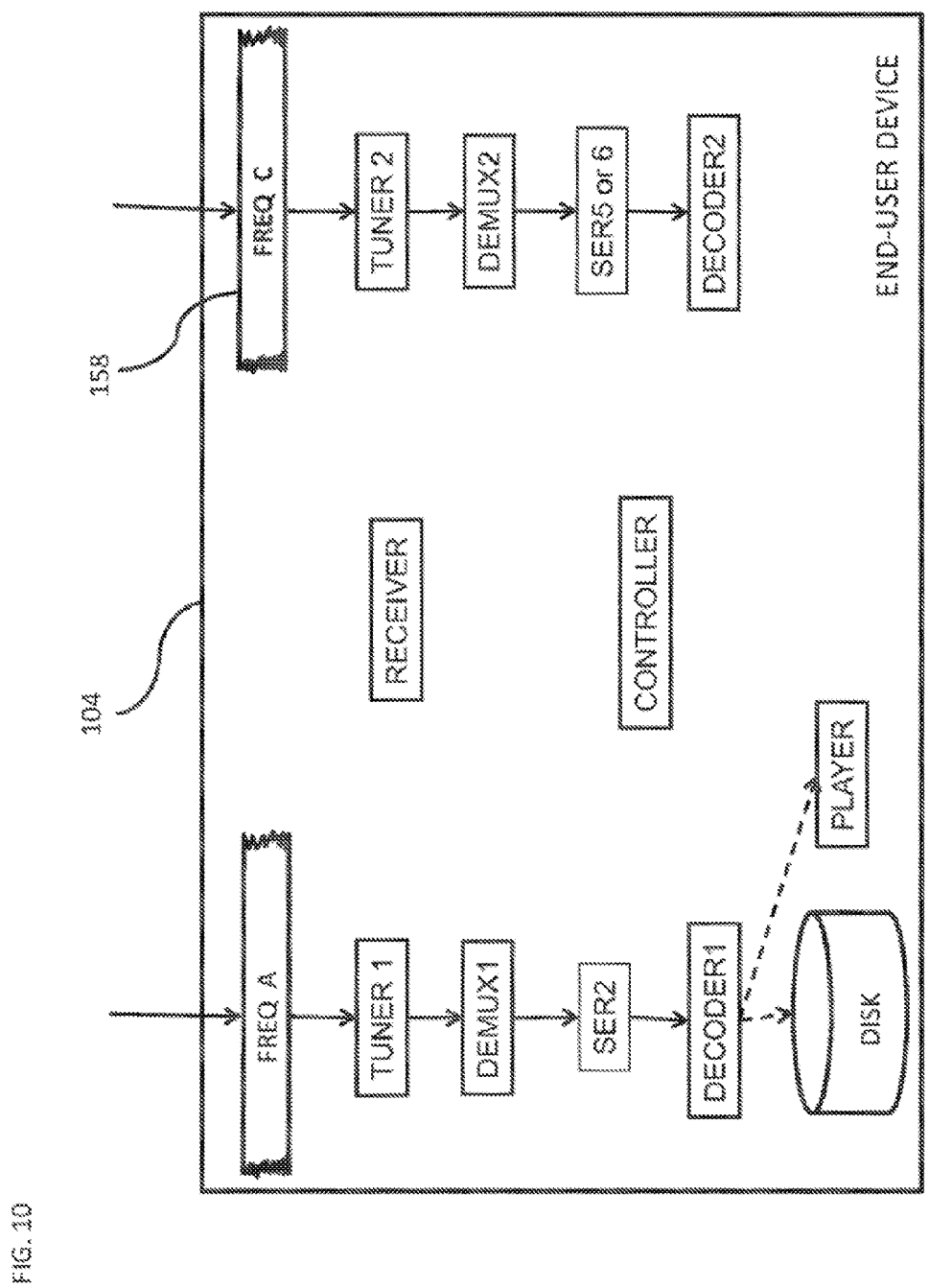
FIG. 10 is a partly pictorial, partly block diagram view of an end-user device in the media content delivery system of FIG. 5 tuning to a media content stream with modulation frequency C.

Reference is now made to FIG. 10, which is a partly pictorial, partly block diagram view of the end-user device 104 in the media content delivery system 100 of FIG. 5 tuning to a media content stream 158 with modulation frequency C. The identification 126 shown in FIG. 9 indicated that the media content of service 2 will soon move to modulation frequency C. Therefore, in response to decrypting the encrypted identification 114 (FIG. 9), TUNER 2 is now operative to tune to modulation frequency C in order to be ready to receive service 2.

Figure 11:
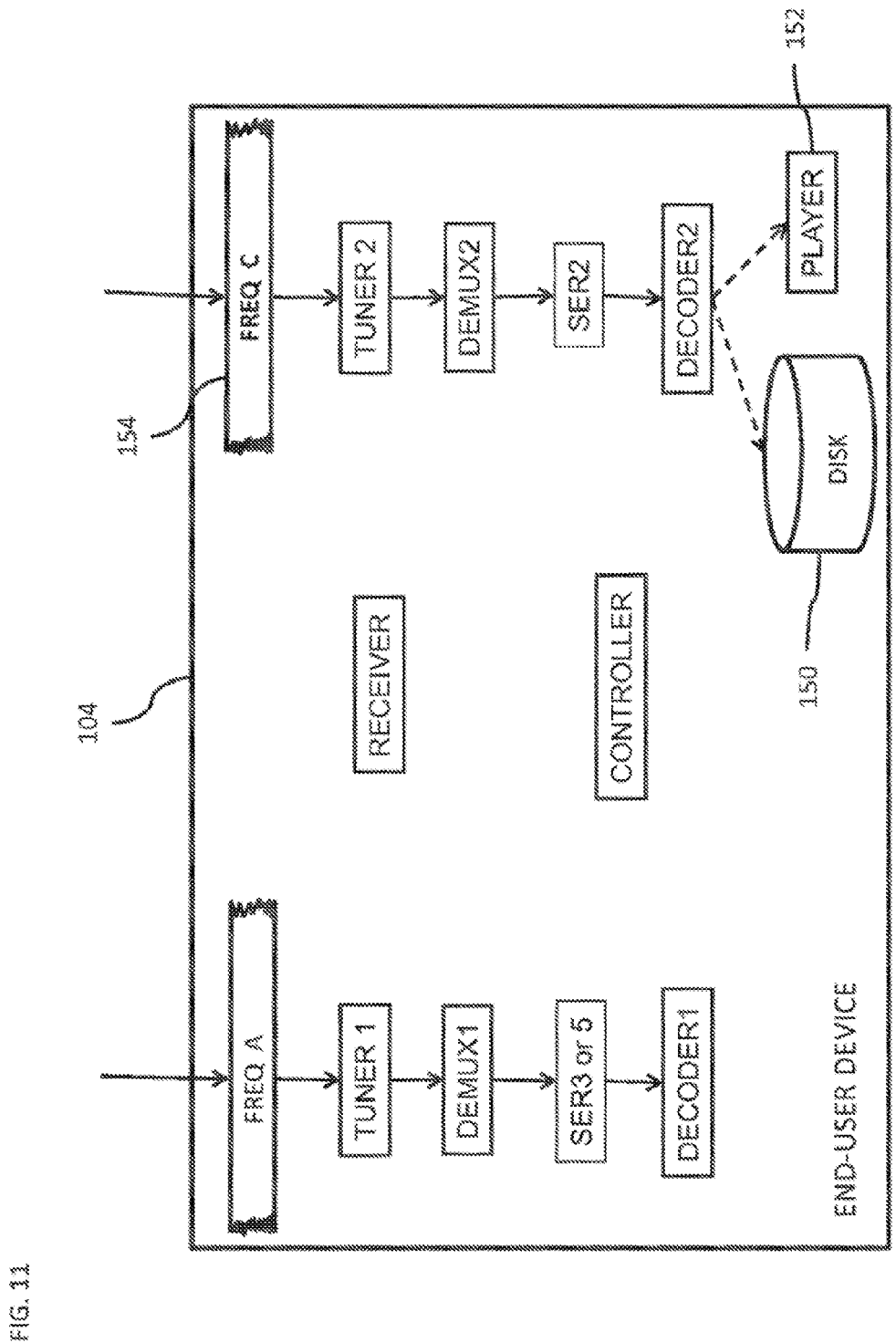
FIG. 11 is a partly pictorial, partly block diagram view of the end-user device switching to rendering the media content stream with modulation frequency C of FIG. 10.

Reference is now made to FIG. 11, which is a partly pictorial, partly block diagram view of the end-user device 104 switching to rendering the media content stream 158 with modulation frequency C of FIG. 10. The media content stream 158 may be rendered to the storage device 150 and/or the player 152 for rendering on a suitable output device.

Figure 12:
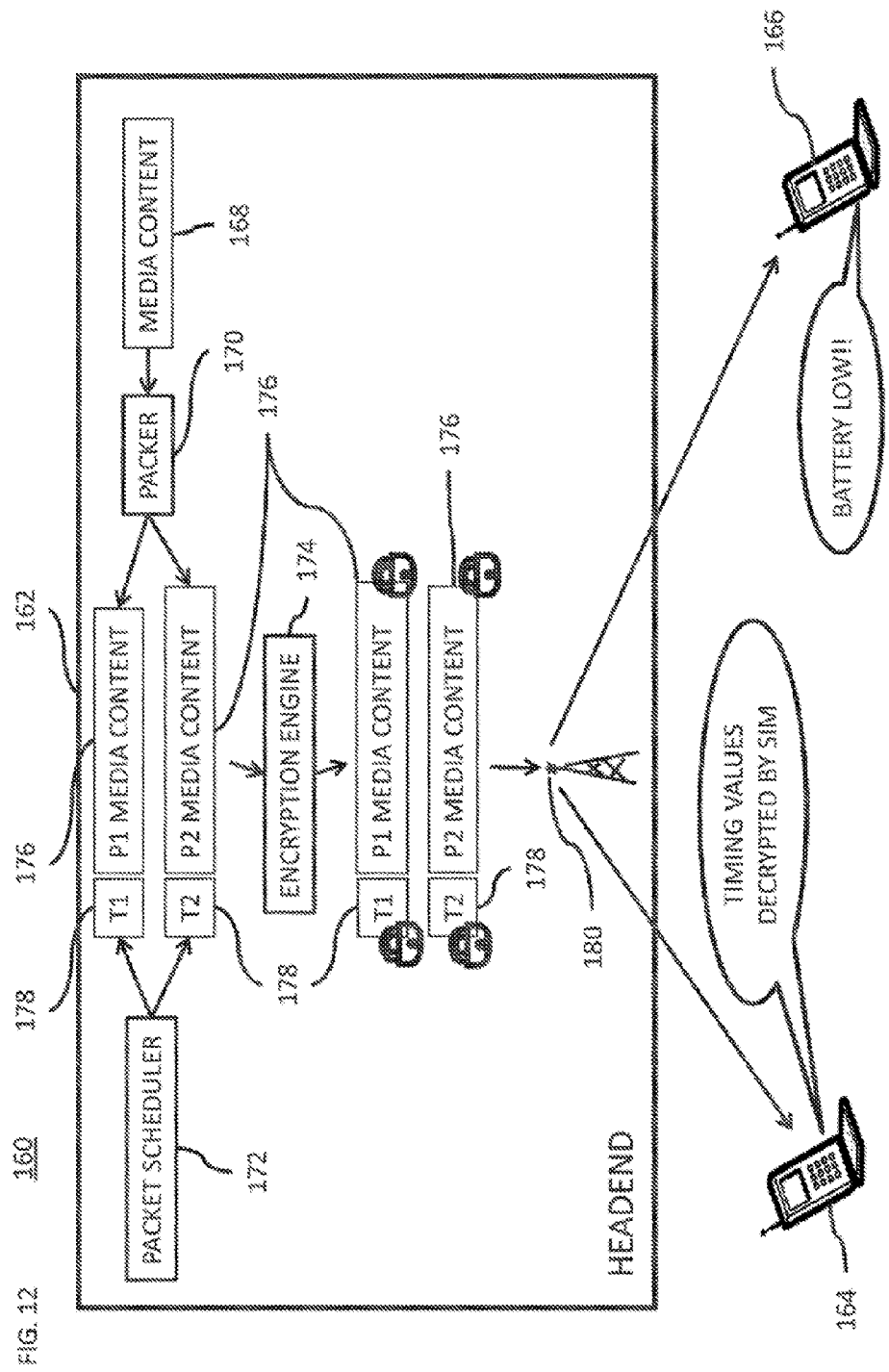
FIG. 12 is a partly pictorial, partly block diagram view of a media content delivery system constructed and operative in accordance with an embodiment of the present invention.

Reference is now made to FIG. 12, which is a partly pictorial, partly block diagram view of a media content delivery system 160 constructed and operative in accordance with an embodiment of the present invention. The media content delivery system 160 includes a Headend 162 and a plurality of end-user devices 164 (only one shown for the sake of simplicity). FIG. 12 also shows an end-user device 166 which is not subscribed to receive content from the Headend 162. The end-user device 166 has found an illicit way to decrypt the content received from the Headend 162.

The Headend 162 transmits media content 168 to the end-user devices 164 using time-slicing in which content is received at certain times called time slices. The time slices are scheduled by the Headend 162.

By way of introduction, in systems that use time-slicing, for example, but not limited to DVB-H systems, an important piece of knowledge is when the next time-slice is scheduled for a particular stream/channel. This knowledge allows the radio and associated components of a receiving device to be shut off in between receiving data (data time-slices) in order to prevent battery drain, by way of example only. Typically, the time of the next time-slice is sent in the current time-slice.

In order to thwart hacker devices such as the end-user device 166 from knowing when the next time slice is scheduled, the timing information is sent by the Headend 162 in an encrypted format. The end-user devices 164 are only informed about the timing of the next time slice slightly before the actual time-slice is due to arrive, as will be described in more detail below. However, an illegal device, such as the end-user device 166 would not know about the timing of the next time slice in time to turn on the wireless receiver to receive the next time slice due to latency in transmitting details of the timing from one of the end-user devices 164 to the end-user device 166 for example via a communication medium such as the Internet and/or wirelessly. Therefore, the only other choice remaining for the end-user device 166 is to leave the radio on all the time and this would quickly drain the battery of the end-user device 166.

The Headend 162 includes a packer 170, a packet scheduler 172, an encryption engine 174 and a transmitter 180.

The packer 170 is typically operative to pack the media content 168 into a plurality of packets 176 including a packet P1 and a packet P2.

The packet scheduler 172 is operative to: schedule when the packets 176 will be broadcast/multicast to the end-user devices 164; and calculate a plurality of timing values 178 including a timing value T1 which provides an indication of how long the packet P2 will arrive at the end-user devices 164 after the arrival of the packet P1 at the end-user devices 164. The packer is typically operative to include the timing value T1 in the packet P1. In the above way, the timing value, which indicates how long the next packet will arrive at the end-user devices 164, is sent to the end-user devices 164 in the packet sent prior to the next packet.

In accordance with an alternative embodiment of the present invention, the timing value T1 may be sent separately from the packet P1.

The encryption engine 174 is typically operative to encrypt the media content 168 of the packets 176 and the timing values 178. The media content 168 of the packet P1 and the timing value T1 are typically encrypted by different encryption algorithms or the same encryption algorithm with different cryptographic keys. Similarly, each packet and the timing value indicating the arrival time of the next packet are encrypted by different encryption algorithms or the same encryption algorithm with different cryptographic keys.

The media content 168 and the timing values 178 are typically encrypted and then placed in the packets 176. Alternatively, the timing values 178 may be encrypted and then placed in the packets 176 and then the media content 168 is placed in the packets 176 and then the packets 176 are encrypted.

The transmitter 180 is typically operative to wirelessly broadcast/multicast the encrypted media content 168 and the encrypted timing values 178 to the end-user devices 164.

Figure 13:
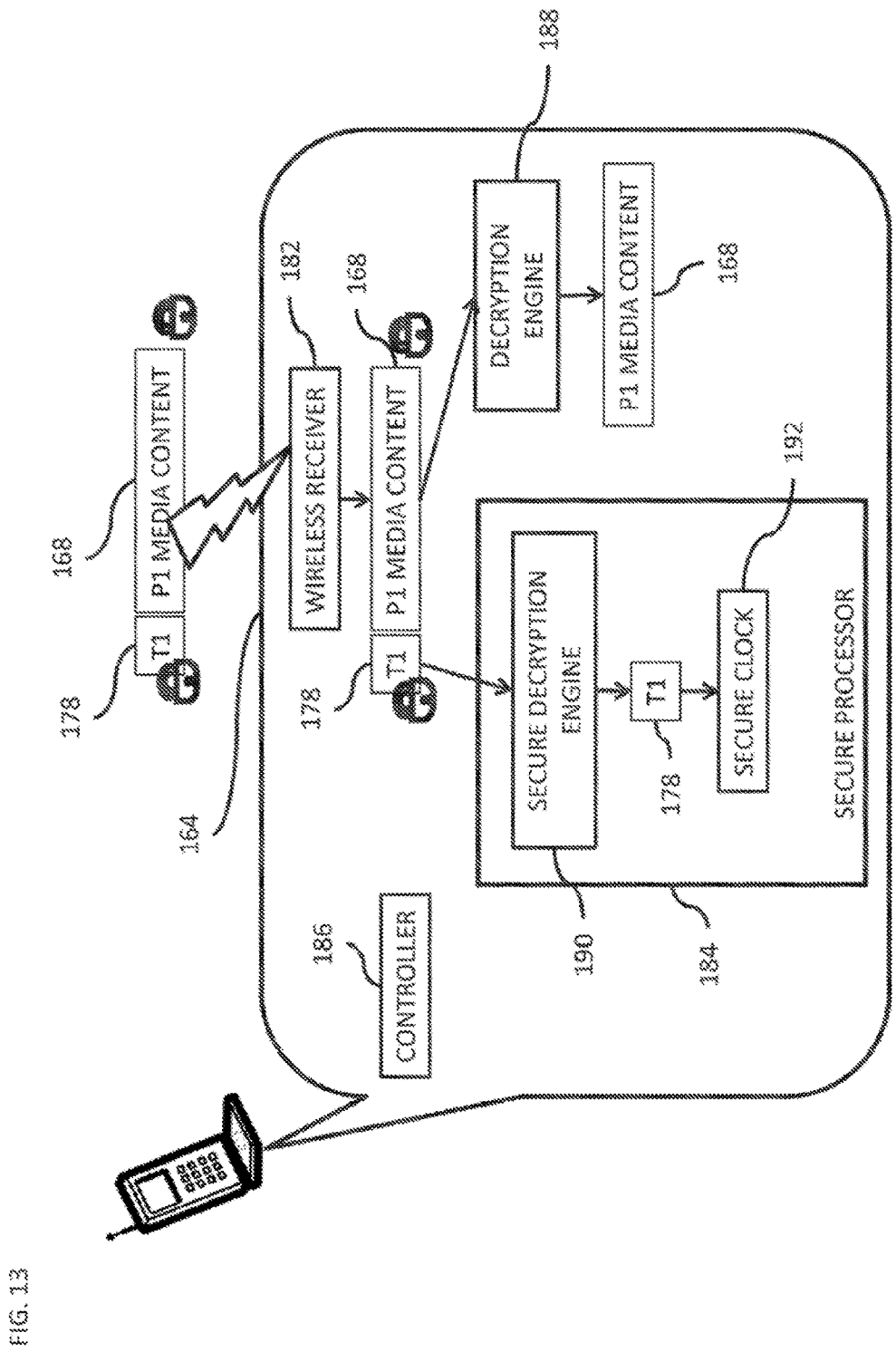
FIG. 13 is a partly pictorial, partly block diagram view of an end-user device receiving a media content packet with a timing value.

Reference is now made to FIG. 13, which is a partly pictorial, partly block diagram view of the end-user device 164 receiving the media content packet 176 with the timing value 178.

The end-user device 164 typically includes a wireless receiver 182, a secure processor 184, a controller 186 and a decryption engine 188.

The wireless receiver 182 is typically operative to receive the packet P1 including encrypted media content 168 and the encrypted timing value 178. The wireless receiver 182 is typically operative to receive more packets in future time slices, for example, the packet P2 (shown in FIG. 15) after receiving the packet P1.

The decryption engine 188 is typically operative to decrypt the encrypted media content 168 in the packet P1 thereby yielding decrypted media content 168.

The secure processor 184 generally includes a secure decryption engine 190 and a secure clock 192. The secure processor 184 may be comprised in a smart card such as a SIM card by way of example only.

The secure decryption engine 190 is typically operative to decrypt the encrypted timing value 178 yielding a non-encrypted timing value 178 providing an indication of how long the next packet (packet P2) will arrive at the end-user device 164 after the arrival of the packet P1 at the end-user device 164. The secret used to decrypt the encrypted timing value 178 is not known by the parts of the device outside of the secure processor 184. The secret may be hard coded in the secure processor 184 or extracted by the secure processor 184 from a control message received from the Headend 162 (FIG. 12), by way of example only.

The secure decryption engine 190 is operative to send the decrypted timing value 178 to the secure clock 192. The secure clock 192 has a timing function. The secure clock 192 is operative to track the timing value 178 against the timing function.

The encrypted media content 168 and the encrypted timing value 178 are decrypted by different decryption algorithms or the same decryption algorithm with different cryptographic keys.

Figure 14:
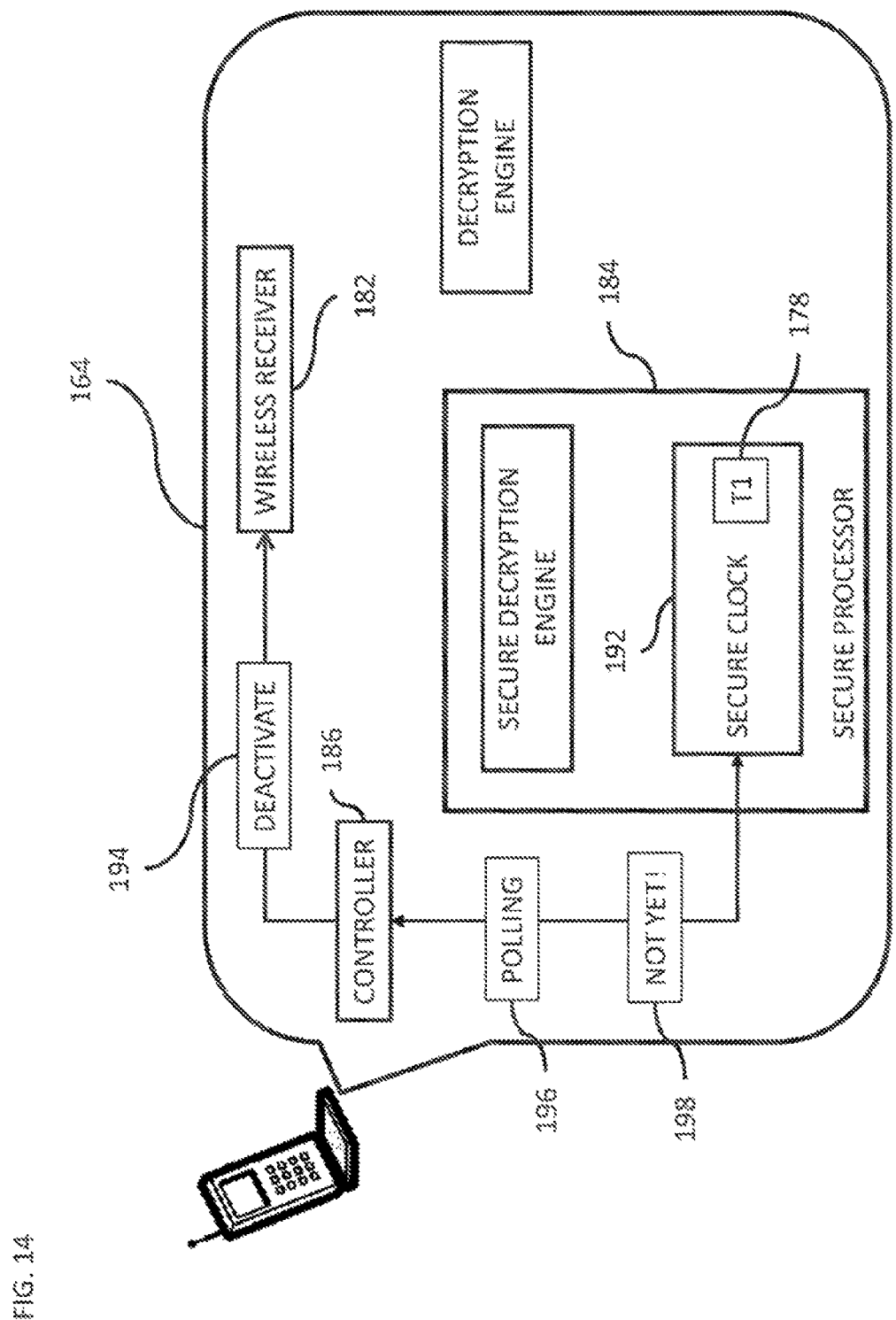
FIG. 14 is a partly pictorial, partly block diagram view of the end-user device of FIG. 13 deactivating wireless reception.

Reference is now made to FIG. 14, which is a partly pictorial, partly block diagram view of the end-user device 164 of FIG. 13 deactivating wireless reception.

The controller 186 is operative to deactivate (block 194) the wireless receiver 182 from receiving data wirelessly after receiving the packet P1 (FIG. 13).

The controller 186 is then operative to periodically interrogate the secure clock 192 whether to activate the wireless receiver 182 or not (block 196). The frequency of repeating the interrogation will depend on how much notice the secure clock gives the wireless receiver 182 before the next packet (packet P2) is due to be received, or vice-versa. The maximum amount of notice given to the wireless receiver 182 before the next packet is due to be received should ideally be less than the time it takes the end-user device 164 to send a message to the illegally operating end-user device 166 (FIG. 12). As the Internet speed can vary considerably, the frequency of interrogation and/or notice time given by the secure clock 192 needs to considered to decide whether to thwart the illicit transfer of information to the end-user device 166 all the time or only some of the time (for example, only when the Internet speed is slower than a particular speed).

The secure clock 192 is operative to respond to the interrogation of the controller 186 according to the timing value 178 being tracked against the timing function of the secure clock 192. If the time until the next packet is due to be received is more than a certain value then the secure clock 192 will respond in such a way that the controller 186 knows not to activate the wireless receiver 182 at present (block 198).

In accordance with an alternative embodiment of the present invention, the secure processor 184 instructs the controller 186 when to activate the wireless receiver 182 without the controller 186 needing to poll the secure process 184.

Figure 15:
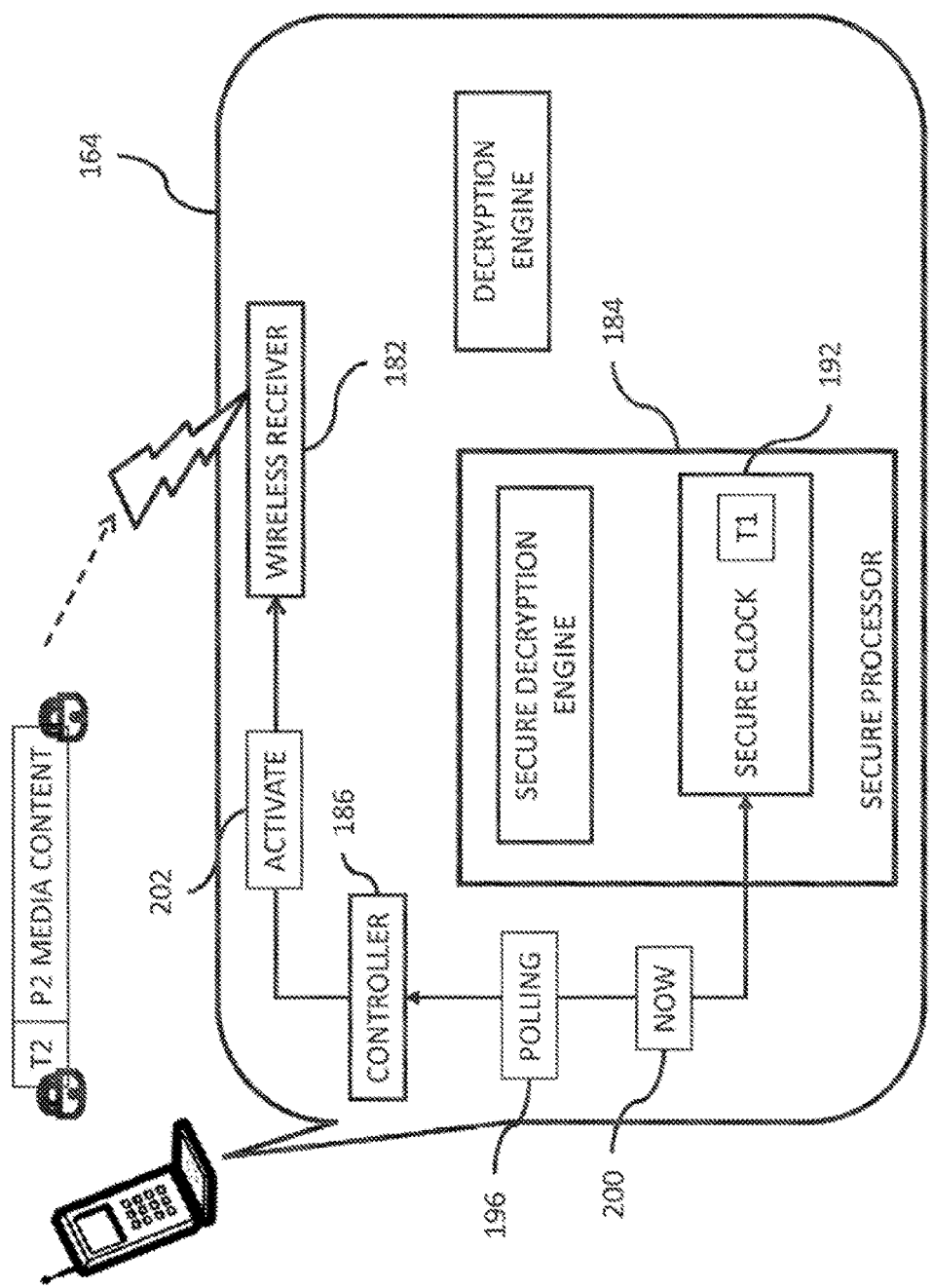
FIG. 15 is a partly pictorial, partly block diagram view of the end-user device of FIG. 13 reactivating wireless reception.

Reference is now made to FIG. 15, which is a partly pictorial, partly block diagram view of the end-user device 164 of FIG. 13 reactivating wireless reception.

As described above with reference to FIG. 14, the controller 186 is operative to periodically interrogate the secure clock 192 whether to activate the wireless receiver 182 or not (block 196).

If the time until the next packet is due to be received is less than a certain value, then the secure clock 192 will respond in such a way that the controller 186 knows to activate the wireless receiver 182 (block 200). Therefore, the controller 186 is operative to activate the wireless receiver 182 to receive the packet P2 in accordance with the timing value T1 (block 202).

As described above with reference to FIG. 14, in accordance with an alternative embodiment of the present invention, the secure processor 184 instructs the controller 186 when to activate the wireless receiver 182 without the controller 186 needing to poll the secure processor 184.

The wireless receiver 182 is typically operative to receive the packet P2 including more of the encrypted media content 168.

It will be appreciated that the time between time slices should vary enough over time in order to thwart the end-user device 166 (FIG. 12). It will be appreciated that the effectiveness of the media content delivery system 160 will depend on the average frequency of the packets 176 and the battery life, by way of example only.

It is appreciated that software components of the present invention may, if desired, be implemented in ROM (read only memory) form. The software components may, generally, be implemented in hardware, if desired, using conventional techniques. It is further appreciated that the software components may be instantiated, for example, as a computer program product; on a tangible medium; or as a signal interpretable by an appropriate computer.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A system comprising a processor coupled to a memory device containing computer-readable code, such that when the computer-readable code is executed by the processor, the processor performs the following operations:
    pack media content into a plurality of packets including a first packet and a second packet;
    schedule when the plurality of packets will be broadcast/multicast to an end-user device;
    calculate a plurality of timing values comprising a first timing value that provides an indication of how long the second packet will arrive at the end-user device after the arrival of the first packet at the end-user device; and
    encrypt a first portion of the media content placed in the first packet and the first timing value, wherein the portion of the media content placed in the first packet and the first timing value are encrypted by one of the following: two different encryption algorithms and a same encryption algorithm with two different cryptographic keys, wherein the end user device is operative to: deactivate a wireless receiver after receiving the first packet and not reactivate the wireless receiver when a time until arrival of the second packet is more than a predetermined value, and wherein the time until arrival of the second packet is determined based on a present time and the first timing value.

2. The system according to claim 1, further comprising:
    a transmitter to wirelessly broadcast/multicast the first packet comprising the encrypted first portion of the media content and the encrypted first timing value to the end-user device.

3. The system according to claim 1, wherein the first timing value is included in the first packet.

4. A system comprising:
    a wireless receiver to receive:
    a first packet comprising encrypted media content and an encrypted timing value;
    a first decryption engine to decrypt the encrypted timing value yielding a non-encrypted timing value providing an indication of how long a second packet will arrive at the end-user device after the arrival of the first packet at the end-user device;
    a second decryption engine to decrypt the encrypted media content, wherein the media content and the timing value are decrypted by one of the following: two different decryption algorithms; and a same decryption algorithm with two different cryptographic keys; and
    a controller to: deactivate the wireless receiver from receiving data wirelessly after receiving the first packet; and activate the wireless receiver to receive the second packet in response to determine that a time until arrival of the second packet is less than a predetermined value, wherein the time until arrival of the second packet is determined based on a present time and the timing value.

5. The system according to claim 4, further comprising a secure processor including the first decryption engine and a secure clock, wherein
    the first decryption engine is operative to send the decrypted timing value to the secure clock; and
    the secure clock having a timing function, the secure clock being operative to track the timing value against the timing function.

6. The system according to claim 5, wherein:
    the controller is operative to periodically interrogate the secure clock whether to activate the wireless receiver or not; and
    the secure clock is operative to respond to the interrogation of the controller according to the timing value being tracked against the timing function of the secure clock.

7. The system according to claim 5, wherein the secure processor is comprised in a smart card.

8. The system according to claim 5, wherein the secure processor is operative to instruct the controller when to activate the wireless receiver without the controller needing to poll the secure processor.

9. The system according to claim 5, wherein the controller is operative to activate the wireless receiver when the time until the second packet is less than the predetermined time.

10. The system according to claim 9, wherein the wireless receiver, after being reactivated, is operative to receive the second packet.

11. A method comprising:
    receiving at a wireless receiver: a first packet including encrypted media content and an encrypted timing value;
    decrypting the encrypted timing value yielding a non-encrypted timing value providing an indication of how long a second packet will arrive at the wireless receiver after the arrival of the first packet at the end-user device;
    decrypting the encrypted media content, wherein the media content and the timing value are decrypted by one of the following: two different decryption algorithms; and a same decryption algorithm with two different cryptographic keys;
    deactivating the wireless receiver from receiving data wirelessly after receiving the first packet; and not activating the wireless receiver to receive the second packet when a time until arrival of the second packet is less than a predetermined value, wherein the time until the second packet is determined based on a present time and timing value.

12. The method according to claim 11, further comprising:
sending the decrypted timing value to a secure clock; and
tracking the timing value.

13. The method according to claim 11, further comprising activating the wireless receiver when the time until the second packet is less than the predetermined time.

14. The method according to claim 12, further comprising:
periodically interrogating the secure clock whether to activate the wireless receiver or not; and
responding to the interrogating according to the timing value being tracked.

15. The method according to claim 13, further comprising receiving the second packet.

\* \* \* \* \*